United States Patent
Ito et al.

(10) Patent No.: US 10,659,457 B2
(45) Date of Patent: May 19, 2020

(54) INFORMATION PROCESSING DEVICE, INFORMATION PROCESSING SYSTEM, AND INFORMATION PROCESSING METHOD

(71) Applicant: FUJITSU LIMITED, Kawasaki-shi, Kanagawa (JP)

(72) Inventors: Hidenobu Ito, Kawasaki (JP); Koichi Yasaki, Kawasaki (JP); Takuya Sakamoto, Kawasaki (JP); Kazuaki Nimura, Kawasaki (JP); Yosuke Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 191 days.

(21) Appl. No.: 15/718,353

(22) Filed: Sep. 28, 2017

(65) Prior Publication Data

US 2018/0115546 A1 Apr. 26, 2018

(30) Foreign Application Priority Data

Oct. 24, 2016 (JP) .................................. 2016-208185

(51) Int. Cl.
*H04L 29/06* (2006.01)
*G06F 21/30* (2013.01)
(Continued)

(52) U.S. Cl.
CPC .......... *H04L 63/0861* (2013.01); *G06F 21/30* (2013.01); *H04L 63/06* (2013.01);
(Continued)

(58) Field of Classification Search
CPC ..... H04L 63/0861; H04L 63/06; H04L 63/08; H04L 67/42; H04W 4/80; H04W 12/06; G06F 21/30
See application file for complete search history.

(56) References Cited

U.S. PATENT DOCUMENTS 7,149,895 B1 * 12/2006 Asokan ................. G06F 21/305
713/159
7,793,102 B2 * 9/2010 Malville ............. H04L 63/0428
713/169
(Continued)

FOREIGN PATENT DOCUMENTS

JP 2003-143136 5/2003
JP 2009-49464 3/2009
(Continued)

OTHER PUBLICATIONS

Extended European Search Report dated Dec. 19, 2017, in corresponding European Patent Application No. 17194735.1.

*Primary Examiner* — Michael Pyzocha
(74) *Attorney, Agent, or Firm* — Staas & Halsey LLP

(57) ABSTRACT

A non-transitory, computer-readable recording medium having stored therein a program for causing a computer execute a process of transmitting a first random value by proximity radio communication to a device coupled via a server and a network, receiving data in which the first random value is encoded, from the device by the proximity radio communication, determining whether the first random value matches a value obtained by decoding the data with a server key obtained in advance from the server, when the value obtained by decoding the data matches the first random value, authenticating a user, and causing the information processing device to execute processing for transmitting a result of the authenticating the user to the server via the device.

12 Claims, 12 Drawing Sheets

(51) Int. Cl.
  *H04W 12/06* (2009.01)
  *H04W 4/80* (2018.01)
(52) U.S. Cl.
  CPC .............. *H04L 63/08* (2013.01); *H04W 4/80* (2018.02); *H04W 12/06* (2013.01); *H04L 67/42* (2013.01)

(56) References Cited

U.S. PATENT DOCUMENTS

| | | | |
|---|---|---|---|
| 8,661,254 | B1 | 2/2014 | Sama |
| 9,009,805 | B1* | 4/2015 | Kirkby ............... H04N 21/2187 726/7 |
| 9,119,069 | B1* | 8/2015 | Vipond ................ H04W 12/06 |
| 9,154,948 | B2* | 10/2015 | Khare ................ H04L 63/0492 |
| 9,571,164 | B1* | 2/2017 | Luo ..................... H04B 5/0056 |
| 2008/0034216 | A1 | 2/2008 | Law |
| 2009/0185687 | A1 | 7/2009 | Wankmueller et al. |
| 2010/0058064 | A1* | 3/2010 | Kirovski ............... H04L 9/3073 713/176 |
| 2010/0153708 | A1* | 6/2010 | Malka .................... G06F 21/78 713/155 |
| 2010/0191967 | A1 | 7/2010 | Fujii et al. |
| 2011/0212707 | A1* | 9/2011 | Mahalal ................ G06Q 20/32 455/411 |
| 2012/0032781 | A1* | 2/2012 | Moon .................... G06F 21/32 340/5.82 |
| 2015/0295952 | A1 | 10/2015 | Takehi |
| 2015/0326398 | A1* | 11/2015 | Modarresi .............. H04L 63/08 713/181 |
| 2015/0332258 | A1* | 11/2015 | Kurabi ................. G06Q 20/401 705/71 |
| 2016/0227348 | A1* | 8/2016 | Guo ...................... H04L 9/3278 |
| 2016/0269403 | A1* | 9/2016 | Koutenaei ........... H04L 63/0861 |
| 2017/0084100 | A1* | 3/2017 | Shibutani ................ E05B 49/00 |
| 2017/0201524 | A1* | 7/2017 | Dureau .................. H04L 63/101 |
| 2017/0237301 | A1* | 8/2017 | Elad ........................ H02J 50/80 307/104 |
| 2018/0096118 | A1* | 4/2018 | Perotti .................. H04L 9/0656 |
| 2018/0262891 | A1* | 9/2018 | Wu ........................ H04W 4/00 |

FOREIGN PATENT DOCUMENTS

| | | |
|---|---|---|
| JP | 2015-203947 | 11/2015 |
| WO | WO 2014/141263 A1 | 9/2014 |

* cited by examiner

INFORMATION PROCESSING DEVICE, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2016-208185, filed on Oct. 24, 2016, the entire contents of which are incorporated herein by reference.

FIELD

The embodiments discussed herein are related to an information processing device, an information processing system, and an information processing method.

BACKGROUND

In recent years, it is said that connection of various articles (pieces of equipment) to the Internet brings significant change to the life and industry. When a user utilizes an article, in order to safely connect the user and the article, the user has to be authenticated and a service has to be provided from the article.

However, when an article is utilized in various situations in life, the article may be too small to be equipped with an authentication device. Also, even when the article is equipped with an authentication device, authentication methods include an authentication method depending on human memory such as password input or pattern input, as well as an authentication method depending on biometric information such as a fingerprint or vein. When an authentication method is different for each article, a user has to utilize each article by an operation according to the authentication method for the article.

To cope with such a problem, fast identity online (FIDO) alliance has formulated an authentication protocol in which biometric authentication information is not passed through a network by using a biometric authentication function of a user terminal such as a smartphone, and biometric authentication information of a user does not have to be managed even on the side of a service (cloud).

Related techniques are disclosed in, for example, Japanese Laid-open Patent Publication Nos. 2009-049464, 2003-143136, and 2015-203947.

In FIDO specification, a user authentication protocol between a terminal equipped with an authentication device and an authentication server is defined. Furthermore, an operable mechanism is established even in a configuration where the authentication device is connected as external equipment of the terminal. However, as a precondition, connection between the authentication device and the terminal is assumed to be established. Thus, when the user authentication is practically performed, for instance, when the authentication device and the terminal are Bluetooth (trademark) connected, after pairing is made, an authentication operation has been performed, and time and effort of a user increases.

Meanwhile, smartphones of these days include many models, each of which is equipped with a device for authentication such as fingerprint authentication, face authentication device, or iris authentication, and for equipment not equipped with an authentication device, a smartphone may be utilized as an external authentication device. In this case, it is convenient if various multiple articles (pieces of equipment) are available using one terminal (information processing device) of a user. However, performing connection processing for all combinations between the terminal and the pieces of equipment in accordance with the above-mentioned method is not practical in consideration of accompanying setting work of the user.

As another aspect, it is not preferable from the view point of security that the information processing device and the equipment are in a connectable state all the time. For instance, when the information processing device which stores biometric information is in a connection standby state for the equipment all the time, the information processing device is likely to be attacked by a guy with malicious intentions. Thus, in a state where no equipment requests to be authenticated in the surrounding it is preferable that the information processing device is not set to a connection standby state.

SUMMARY

According to an aspect of the embodiments, a non-transitory, computer-readable recording medium having stored therein a program for causing a computer execute a process of transmitting a first random value by proximity radio communication to a device coupled via a server and a network, receiving data in which the first random value is encoded, from the device by the proximity radio communication, determining whether the first random value matches a value obtained by decoding the data with a server key obtained in advance from the server, when the value obtained by decoding the data matches the first random value, authenticating a user, and causing the information processing device to execute processing for transmitting a result of the authenticating the user to the server via the device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, the embodiments of the present disclosure will be described with reference to the drawings.

First Embodiment

<System Configuration>

Figure 1:
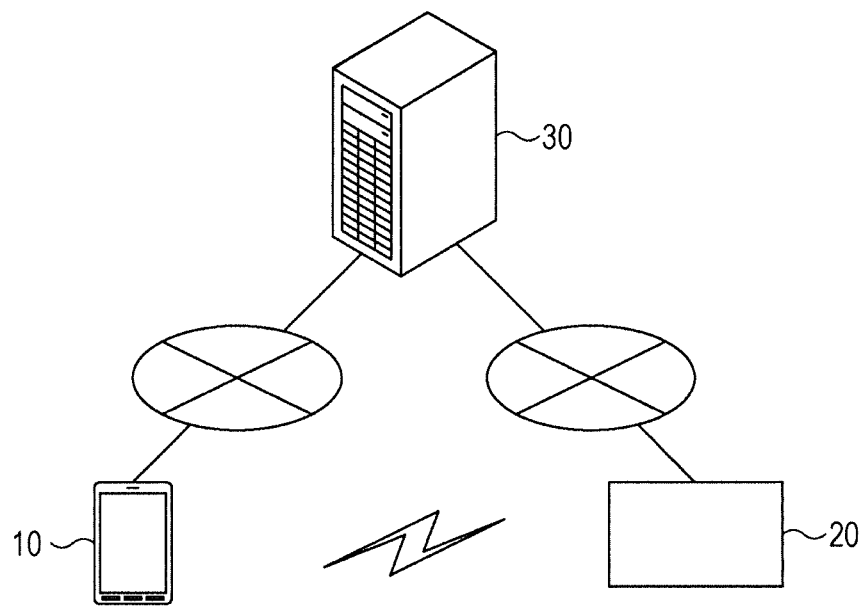
FIG. 1 is a diagram illustrating an example configuration of an information processing system according to a first embodiment.

FIG. 1 is a diagram illustrating an example configuration of an information processing system according to a first embodiment. In FIG. 1, an information processing system 1 includes an information processing device (computer) 10, equipment 20, and a server apparatus 30. For instance, a network such as the Internet, a mobile phone network connects between the information processing device 10 and the server apparatus 30, and between the equipment 20 and the server apparatus 30 in a communicable state.

The information processing device 10 and the equipment 20 are in a mutually communicable state via, for instance, short-distance wireless (radio) communication such as near field radio communication (NFC), Bluetooth (trademark) Low Energy (BLE), or a wireless local area network (LAN), the Internet, a mobile phone network.

The information processing device 10 is a terminal that has a function of authenticating a user, for instance, by fingerprint authentication or face authentication, and that is, for instance, a smartphone, a tablet type terminal, a personal computer (PC), or an IC card having an authentication device. Also, the information processing device 10 registers a user in the server apparatus 30. The information processing device 10 may be shared by multiple users.

The equipment 20 is a device that presents to a user content related to the service provided by the server apparatus 30, and that is, for instance, an automatic teller machine (ATM), a delivery box, a stationary device such as a locker, or a moving device such as an automobile. Alternatively, the equipment 20 may be a terminal such as a smartphone or a PC, a built-in device such as a lock attached to a door.

The equipment 20 requests the information processing device 10 for user authentication according to an operation or the like of a user, and acquires a result of the user authentication from the information processing device 10.

The server apparatus 30 is an apparatus that provides predetermined services from a remote place by communication, for instance, via the Internet. The server apparatus 30 may provide services such as an online banking service, a lock management service that remotely controls a locker or a door lock, a vehicle information service (VIS) that provides management of operation information on a vehicle and maps or entertainment information, for instance.

<Hardware Configuration>

Figure 2:
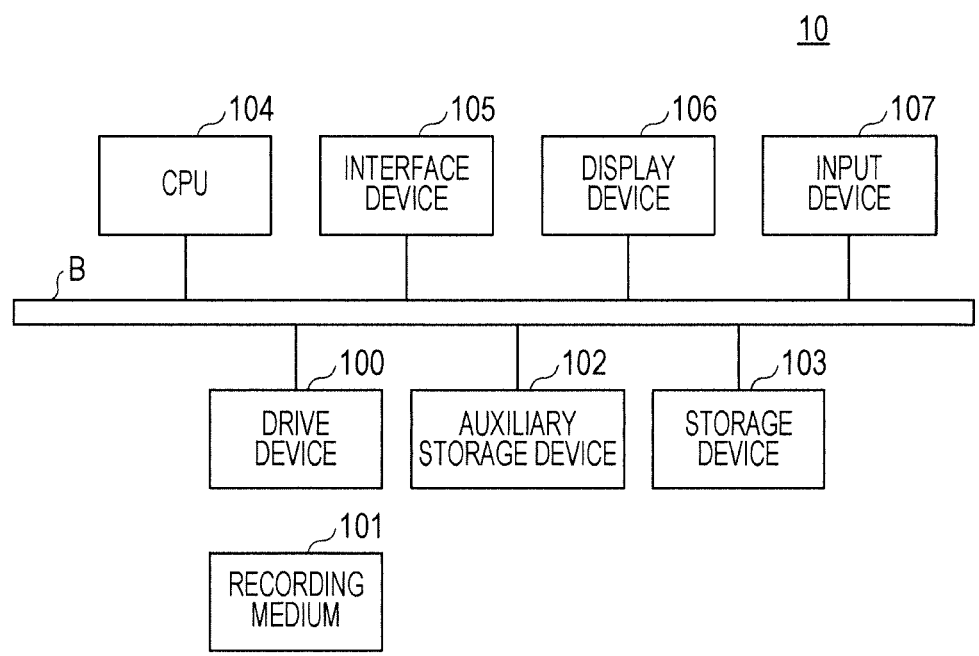
FIG. 2 is a diagram illustrating an example configuration of an information processing device in the embodiment.

FIG. 2 is a diagram illustrating an example configuration of the information processing device 10 in the embodiment. The information processing device 10 in FIG. 2 has a drive device 100, an auxiliary storage device 102, a storage device 103, a CPU 104, an interface device 105, a display device 106, and an input device 107 that are coupled to each other via a bath B.

An information processing program which implements the processing in the information processing device 10 is provided by a recording medium 101. When the recording medium 101, which records the information processing program, is set in the drive device 100, the information processing program is installed in the auxiliary storage device 102 from the recording medium 101 through the drive device 100. However, it is not requested that the information processing program is installed from the recording medium 101. The information processing program may be downloaded from another computer via a network. The auxiliary storage device 102 stores the installed information processing program as well as requested files and data.

When a program start-up command is issued, the storage device 103 reads a program from the auxiliary storage device 102 and stores the program. The CPU 104 implements the functions related to the information processing device 10 in accordance with the program stored in the storage device 103. The interface device 105 is used as an interface for coupling to a network. The display device 106 displays a graphical user interface (GUI) or the like by a program. The input device 107 includes a touch panel and a button or the like or a keyboard and a mouse or the like, and is used to allow various operational instructions to be inputted.

It is to be noted that examples of the recording medium 101 include a portable-type recording medium such as a CD-ROM, a DVD disk, or a USB memory. It is to be noted that examples of the auxiliary storage device 102 include a hard disk drive (HDD) and a flash memory. Each of the recording medium 101 and the auxiliary storage device 102 serves as a computer-readable recording medium.

In addition, the information processing device 10 may include hardware that obtains biometric information of a user, such as a camera or a fingerprint acquisition device.

The hardware configuration of the equipment 20 and the server apparatus 30 may be the same as the example hardware configuration of the information processing device 10 illustrated in FIG. 2.

<Functional Configuration>

Figure 3:
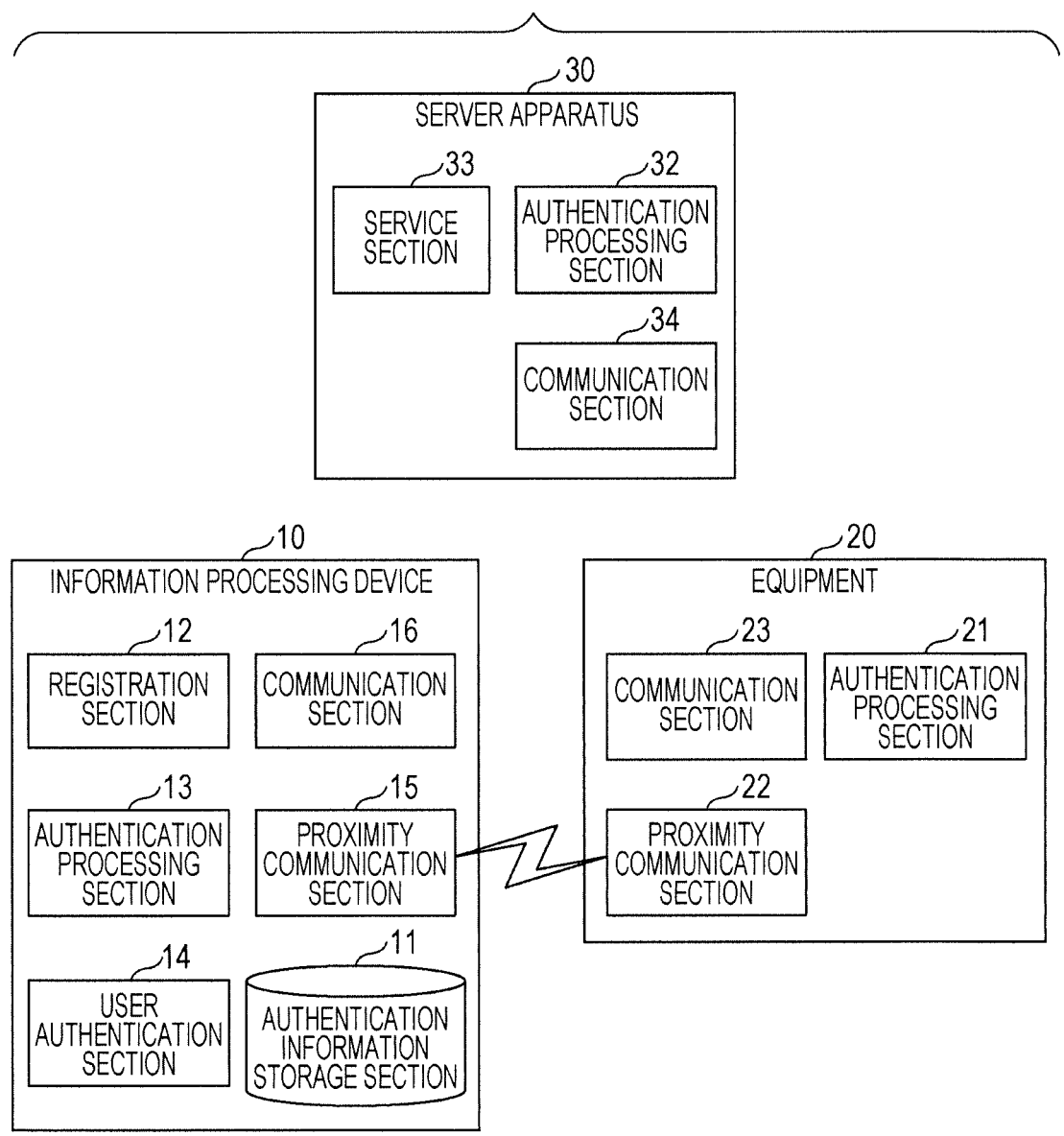
FIG. 3 is a diagram illustrating an example functional configuration of the information processing device, a piece of equipment, and a server apparatus according to the first embodiment.

Next, the functional configuration of the information processing device 10, the equipment 20, and the server apparatus 30 according to the first embodiment will be described with reference to FIG. 3. FIG. 3 is a diagram illustrating the functional configuration of the information processing device, the equipment 20, and the server apparatus 30 according to the first embodiment.

<<Information Processing Apparatus>>

The Information Processing Device 10 has an Authentication information storage section 11. The authentication information storage section 11 is implemented using the auxiliary storage device 102, for instance.

The authentication information storage section 11 stores data such as a server certificate.

In addition, the information processing device 10 has a registration section 12, an authentication processing section 13, a user authentication section 14, a proximity communication section 15, and a communication section 16. These sections are implemented by the processing executed by the CPU 104 of the information processing device 10 in accordance with one or more programs installed in the information processing device 10.

The registration section 12 registers a public key for each user in the server apparatus 30 via the communication section 16. The registration section 12 may register a public key generated by the user authentication section 14 for an authentication method of a user in the server apparatus 30.

The authentication processing section 13 performs the later-described equipment identification processing and user authentication processing.

The authentication processing section 13 transmits a first challenge which is a random value to the equipment 20 via the proximity communication section 15. The authentication processing section 13 receives a token from the equipment 20 via the proximity communication section 15, the token being a value obtained by encoding the first challenge with a server key of the server apparatus 30. When the first challenge matches a value pre-decoded from the token with the server key obtained from the server apparatus 30, the authentication processing section 13 establishes connection for notifying the equipment 20 of a result of the authentication of a user, and achieves a communicable state. In other words, in a state where the equipment 20 is already authenticated by the server apparatus 30, the information processing device 10 indirectly trusts the equipment 20 by verifying the server apparatus 30.

The user authentication section 14 authenticates a user by a predetermined authentication method. Multiple user authentication sections 14 may be provided according to an authentication method such as fingerprint authentication, iris authentication, password authentication, for instance.

The proximity communication section 15 performs (short-distance wireless communication) with the equipment 20 using NFC, BLE, or a wireless LAN.

The communication section 16 performs communication with the server apparatus 30 or the equipment 20, for instance, via a mobile phone network or the Internet. In addition, the communication section 16 performs communication with the equipment 20 using the proximity communication section 15.

<<Device>>

The equipment 20 has an authentication processing section 21, a proximity communication section 22, and a communication section 23. These sections are implemented by the processing executed by the CPU of the equipment 20 in accordance with one or more programs installed in the equipment 20.

The authentication processing section 21 performs the later-described equipment identification processing and user authentication processing.

The proximity communication section 22 performs proximity communication (short-distance wireless communication) with the information processing device 10 using NFC, BLE, or a wireless LAN.

The communication section 23 performs communication with the server apparatus 30, for instance, via a mobile phone network or the Internet.

<<Server Apparatus>>

The server apparatus 30 has an authentication information storage section 31. The authentication information storage section 31 is implemented using, for instance, the auxiliary storage device of the server apparatus 30. The data to be stored in the authentication information storage section 31 will be described later.

In addition, the server apparatus 30 has an authentication processing section 32, a service section 33, and a communication section 34. These sections are implemented by the processing executed by the CPU of server apparatus 30 in accordance with one or more programs installed in the server apparatus 30.

The authentication processing section 32 performs the later-described equipment identification processing and user authentication processing.

The service section 33 provides the information processing device 10 with predetermined contents and the like.

The communication section 34 performs communication with the information processing device 10 and the equipment 20, for instance, via a mobile phone network or the Internet.

<Processing>

<<Registration Processing>>

Figure 4:
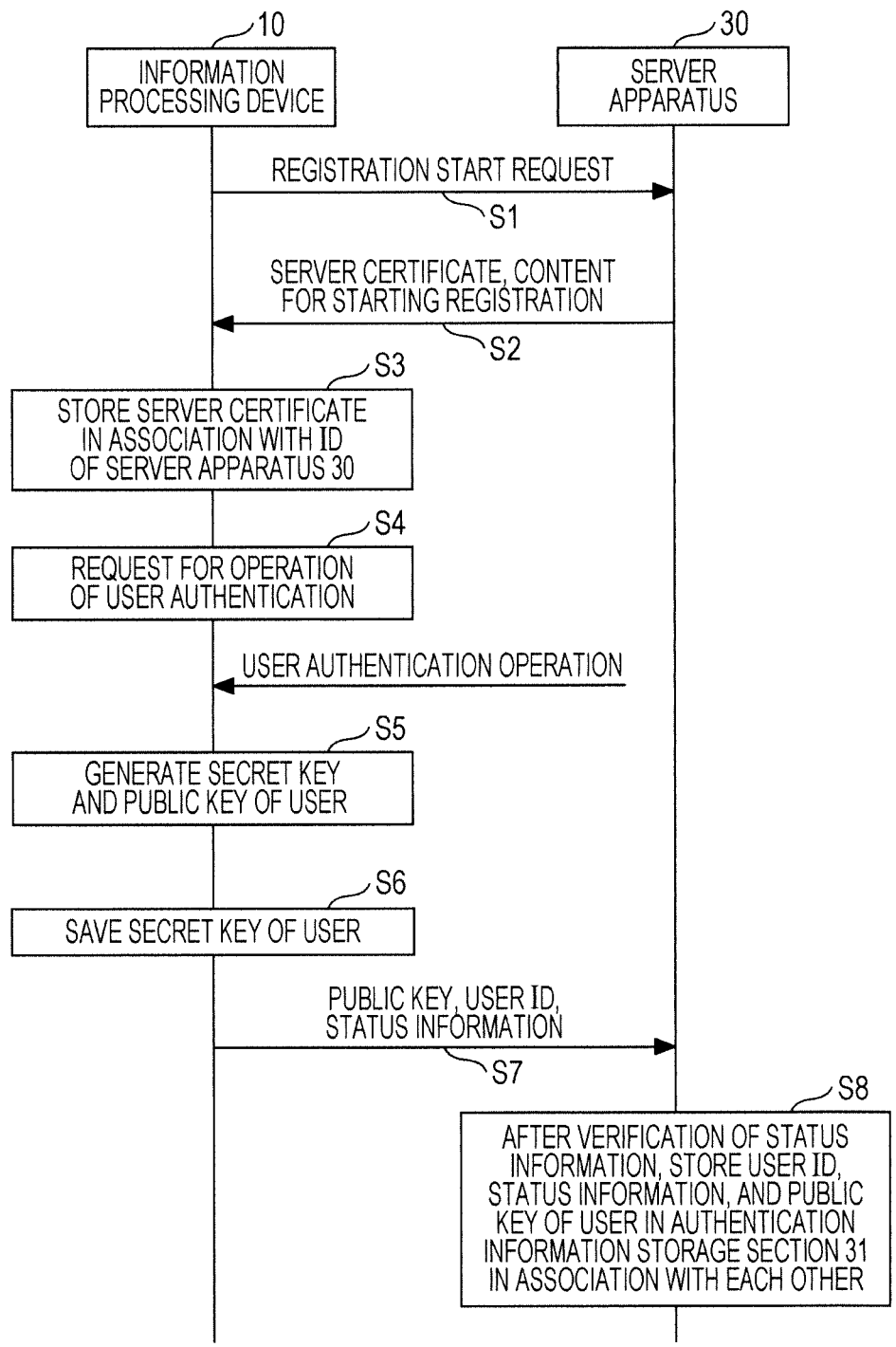
FIG. 4 is a sequence diagram illustrating an example of registration processing of the information processing system according to the first embodiment.

Next, the registration processing performed by the information processing system 1 according to the first embodiment will be described with reference to FIG. 4. FIG. 4 is a sequence diagram illustrating an example of registration processing of the information processing system 1 according to the first embodiment.

In step S1, the registration section 12 of the information processing device 10 starts up an application for registration (hereinafter also referred to as an "application"), and requests the server apparatus 30 for content for starting registration. For instance, when the application for registration is a Web browser, HTML data on a registration page is requested.

Subsequently, the authentication processing section 32 of the server apparatus 30 transmits the content for starting registration along with a server certificate of the server apparatus 30 to the information processing device 10 (step S2). The server certificate includes a public key of the server apparatus 30.

Subsequently, the registration section 12 of the information processing device 10 stores the received server certificate in the authentication information storage section 11 in association with the server ID (for instance, the URL of server apparatus 30) of the server apparatus 30 (step S3).

Subsequently, the registration section 12 of the information processing device 10 requests the authentication processing section 13 for an operation of user authentication based on the content for starting registration using the application for registration (step S4). The authentication processing section which received the request displays, for instance, a screen that requests biometric authentication of a user, via the user authentication section 14. The user then performs requested operations according to the screen. For instance, the user is biometrically authenticated by the information processing device 10. The user authentication section 14 of the information processing device 10 authenticates the user based on biometric information on the user. In this process, correct biometric information on the user, which is, for instance, pre-registered in the information processing device 10, is used. When correct biometric information is unregistered, biometric information may be registered at the same time.

When the user is successfully authenticated by the user authentication section 14, the user authentication section 14 of the information processing device 10 generates a key pair (a secret key and a public key) of asymmetrical keys of the user (step S5). When multiple user authentication sections 14 are provided, a key pair of asymmetrical keys is generated for each of the user authentication sections 14.

In this process, status information when biometric authentication is performed is also generated at the same time. The status information includes, for instance, an application ID indicating which registration application is used, an authentication method information indicating which authentication device is used, and a certificate of the information processing device indicating that a key is generated in a safe memory area.

Subsequently, the user authentication section 14 of the information processing device 10 saves KeyID in the authentication information storage section 11 in association with the server ID, the KeyID identifying the secret key of the user out of the generated asymmetrical keys and the user authentication section 14 used by the user authentication (step S6). The user authentication section 14 passes the public key of the user out of the generated asymmetrical keys along with the identification information (user ID) on the user, the status information, and KeyID to the authentication processing section 13. The authentication processing section 13 converts the KeyID into an application ID of the registration section, signs the above-mentioned information with the secret key of the user, and transmits the information to the server apparatus 30 (step S7).

Subsequently, the authentication processing section 32 of the server apparatus 30 verifies whether or not the certificate included in the received status information is correct, and when verifying the correctness of the information, stores the user ID, the application ID, the status information, and the public key of the user in the authentication information storage section 31 in association with each other (step S8).

<<Equipment Identification Processing>>

Figure 5:
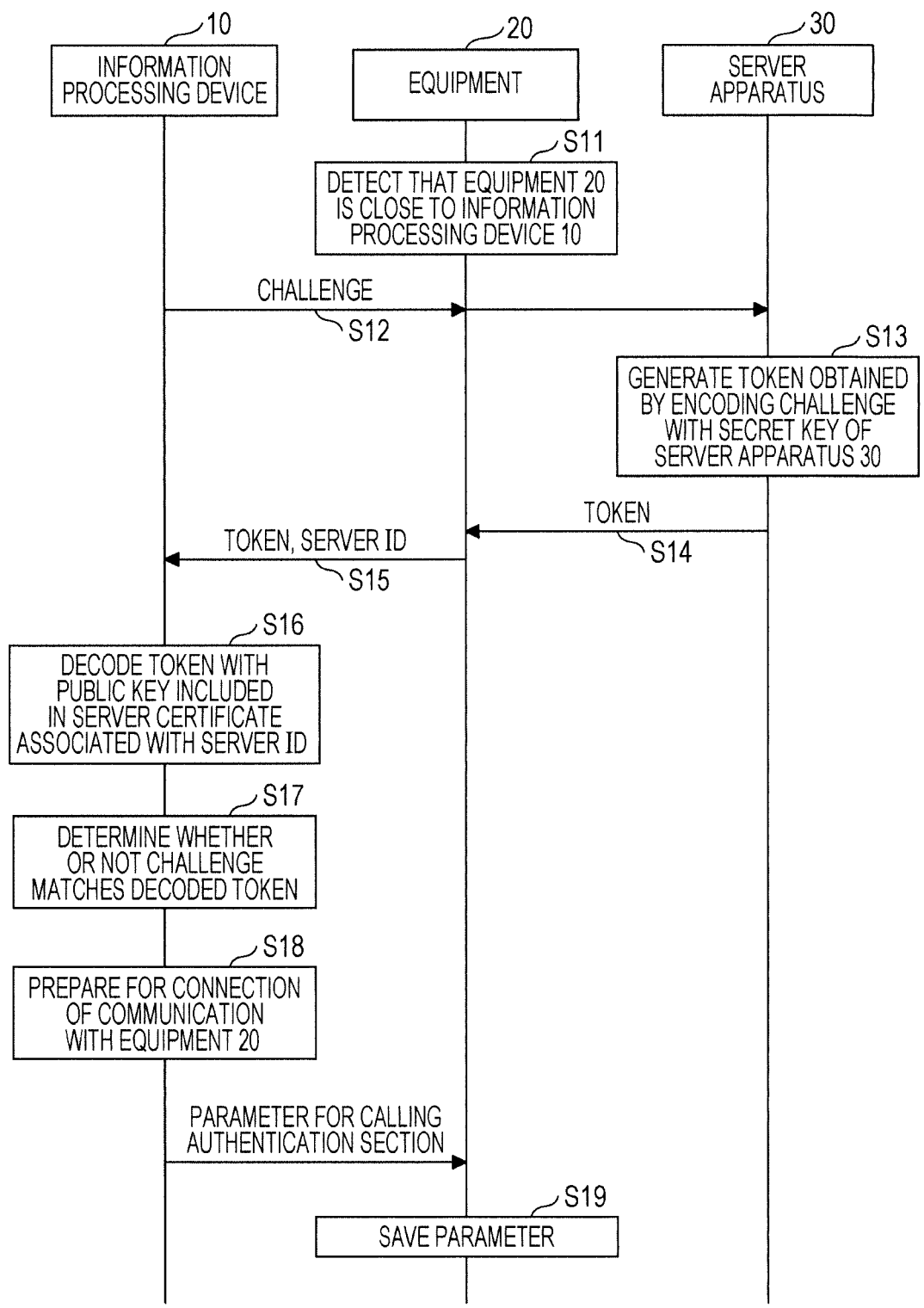
FIG. 5 is a sequence diagram illustrating an example of equipment identification processing of the information processing system according to the first embodiment.

Next, the equipment identification processing performed by the information processing system 1 according to the first embodiment will be described with reference to FIG. 5. FIG. 5 is a sequence diagram illustrating an example of the equipment identification processing of the information processing system 1 according to the first embodiment. When a user utilizes services of the server apparatus 30 using the information processing device 10, the equipment identification processing and the later-described user authentication processing are performed. It is to be noted that the above-described registration processing is assumed to be completed before the equipment identification processing is performed.

In step S11, the authentication processing section 21 of the equipment 20 detects by the proximity communication section 22 that the equipment 20 is close to the information processing device 10.

Subsequently, the authentication processing section 21 of the equipment 20 receives the value of challenge which is a random value by an NFC reader from an NFC tag included in the interface device 105 of the information processing device 10, and transmits the challenge to the server apparatus 30 (step S12).

Subsequently, the authentication processing section 32 of the server apparatus 30 generates a token obtained by encoding (signing) the received challenge with the secret key of the server apparatus 30 (step S13), and transmits the token to the equipment 20 (step S14).

Subsequently, the authentication processing section 21 of the equipment 20 adds the server ID to the received token, and transfers the token to the NFC tag of the information processing device 10 (step S15). It is to be noted that the server ID of the server apparatus 30 may be pre-set in the equipment 20.

Subsequently, the authentication processing section 13 of the information processing device 10 decodes the received token with a public key included in a server certificate associated with the server ID added to the token (step S16).

Subsequently, the authentication processing section 13 of the information processing device 10 determines whether or not the above-described challenge matches a value obtained by decoding the token (step S17).

Subsequently, when the above-described challenge and the value obtained by decoding the token match, the authentication processing section 13 of the information processing device 10 determines that the equipment 20 corresponds to a registered server apparatus 30, and prepares for the connection of communication for notifying the equipment 20 of a result of authentication of the user (step S18). It is to be noted that the processing is terminated when the decoding is failed or when the challenge does not match the value obtained by decoding the token.

In step S18, the information processing device 10 determines a communication system, parameters requested for communication, a module name for identifying the user authentication section 14 in the information processing device 10, and an ID (KeyID) for identifying the user authentication section 14 of the information processing device 10 in the equipment 20.

As a system of communication with the equipment 20, the communication by NFC may be used as is, or for instance, communication by IP via a network or another communication unit such as Bluetooth may be used. An appropriate system is selected by a communication unit owned by the information processing device 10 and the equipment 20. The selection method may be pre-determined by the information processing device 10 or may be specified by a server at the time of service registration, or the equipment 20 may specify a communication system along with the token at the same time by writing them in the NFC tag of the information processing device 10.

When the communication by IP is selected as a communication system, the information processing device 10 opens a port for IP connection to set a connection standby state. Here, the number of port to be opened is preferably a random number to avoid reuse of the number.

Next, the information on the NFC tag is updated with the IP address, the port number of the information processing device 10, a module name (for instance, an application name of the authentication unit module in the case of Android OS) of an authentication unit such as a fingerprint authentication device included in the user authentication section 14, and a KeyID generated in associated with the authentication unit module.

Upon detecting the update of the tag information, the proximity communication section 22 of the equipment 20 reads the information on the updated tag, and saves the read information such as a KeyID, serving as a parameter for calling the user authentication section 14 (step S19). When a series of the processing is completed, a service application of the equipment 20 displays a service provision screen. It is to be noted that when the service application is not equipped with a screen, the service application may indicate a service start state, for instance, by turning on an LED attached to the equipment 20.

When the information processing device 10 and the equipment 20 are close to each other, the information processing device 10 is able to authenticate the equipment 20 by the above-described registration processing and equipment identification processing using the public key of the server apparatus 30 stored in the information processing device 10 and the secret key of the server apparatus 30 coupled to the equipment 20. When the authentication is successful, communication between the information processing device 10 and the equipment 20 may be temporarily utilized. Consequently, it is possible to perform the user authentication processing described below.

<<User Authentication Processing>>

Figure 6:
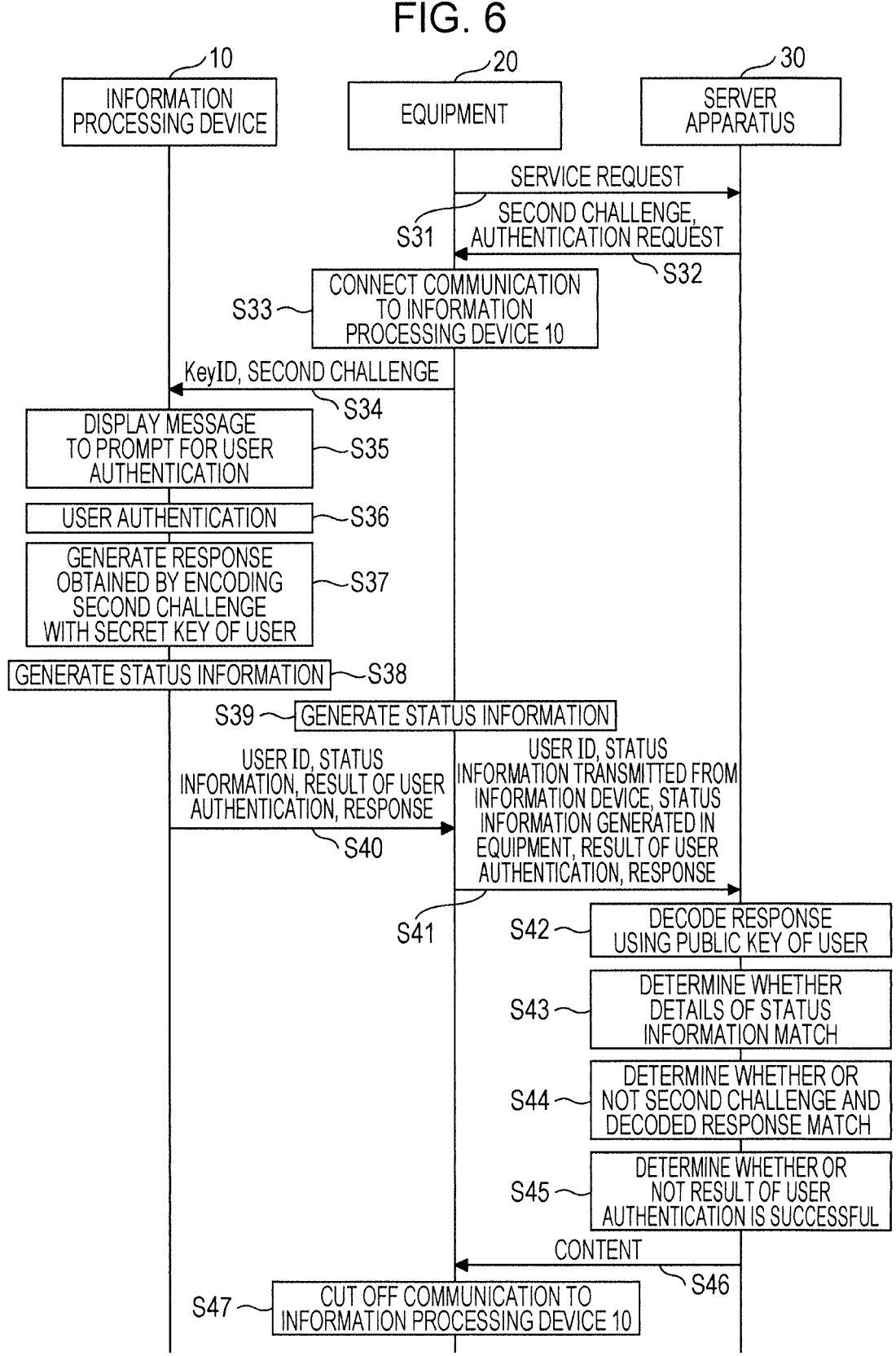
FIG. 6 is a sequence diagram illustrating an example of user authentication processing of the information processing system according to the first embodiment.

Next, the user authentication processing performed by the information processing system 1 according to the first embodiment will be described with reference to FIG. 6. FIG. 6 is a sequence diagram illustrating an example of the user authentication processing of the information processing system 1 according to the first embodiment. It is to be noted that the user authentication processing is performed subsequently to the equipment identification processing described above.

In step S31, when a predetermined service start operation is performed by a user on the service provision screen displayed on the equipment 20 by the service application of the equipment 20, the authentication processing section 21 of the equipment 20 transmits a service request to the server apparatus 30.

Subsequently, the authentication processing section 32 of the server apparatus 30 transmits a certification request along with a challenge (hereinafter also referred to as a "second challenge") which is a random value to the equipment 20 (step S32).

Subsequently, the communication section 23 of the equipment 20 connects communication to the IP address and the port number, obtained in step S18, of the information processing device 10 (step S33).

Subsequently, the authentication processing section 21 of the equipment 20 transmits the KeyID obtained in step S18 and the second challenge using the system of communication which is temporarily connectable in step S18 to the information processing device 10 (step S34). Thus, the authentication method used for user authentication may be specified from the server apparatus 30.

Subsequently, the user authentication section 14 of the information processing device 10 corresponding to the above-mentioned KeyID displays a message to prompt for user authentication (step S35).

Subsequently, when an authentication operation is performed by the user, the user authentication section 14 of the information processing device 10 corresponding to the above-mentioned KeyID performs user authentication (step S36).

Subsequently, when the user authentication is successful, the user authentication section 14 of the information processing device 10 generates a response which is obtained by encoding the second challenge with the secret key of the user corresponding to the received KeyID (step S37).

Furthermore, the user authentication section 14 of the information processing device 10 collects (generates) information on connection temporarily established for authentication, as the status information at the time of authentication in the information processing device 10 (step S38). The information includes, for instance, a time when the NFC tag is read, a connection system and a connection parameter (for instance, in the case of IP connection, an IP address and a port number for connection standby), and an IP communication start time.

Subsequently, similarly to step S38, the authentication processing section 21 of the equipment 20 collects status information at the time of the authentication in the equipment 20 (step S39). The status information at the time of authentication in the device includes, for instance, a time at which the device reads the NFC tag, a connection system and a connection parameter (for instance, in the case of IP connection, an IP address and a port number at a connection destination) for the information processing device, and an IP communication start time.

Subsequently, the information processing device 10 adds the user ID to information signed by the user secret key and including the collected authentication status information, a result of the user authentication, and the response, and transmits all the information to the equipment 20 (step S40).

Subsequently, the authentication processing section 21 of the equipment 20 adds status information at the time of the authentication in the device to the received user ID, the authentication status information of the information processing device, a result of the user authentication, and the response, and transfers all the information to the server apparatus 30 (step S41).

Subsequently, the authentication processing section 32 of the server apparatus 30 obtains the status information at the time of the authentication, a result of the authentication, and the response from the signed information transmitted from the information processing device 10, using the public key of the user obtained by referring to the authentication information storage section 31 with the received user ID (step S42).

Subsequently, the authentication processing section 32 of the server apparatus 30 compares the status information from the information processing device 10 with the status information from the equipment 20 (step S43), and when the details of both information match, it is determined that authentication has been performed in a correct route, and the flow proceeds to the subsequent response verification processing. Here, when read times of an NFC tag have an error within a certain time period, it may be determined that both times match in consideration of some slight delay. When the details of both status information do not match, the information processing device determines that unauthorized processing is performed, and the user authentication has failed because authentication is performed without passing data through a connection route temporarily established for authentication, in other words, without passing data through the device. Since the status information from the information processing device is signed with the user secret key, it is not possible for the device to falsify the content of the status information during transmission to the server.

Subsequently, the server apparatus 30 determines whether or not the second challenge transmitted in step S32 matches the response decoded in step S40 (step S44).

When the determination indicates matching, the authentication processing section 32 of the server apparatus 30 determines whether or not a result of the user authentication is successful (step S45).

When the result of the user authentication is successful, the authentication processing section 32 of the server apparatus 30 authenticates an authorized user, and sends back the content of the service (provides the service) to the equipment 20 (step S46). It is to be noted that when the decoding has failed or when the second challenge and a value obtained by decoding the response do not match, authentication failure is sent back to the equipment 20.

Since the user authentication is completed, the communication section 23 of the equipment 20 cuts off communication with the information processing device 10 (step S47). Thus, the system of communication temporarily connectable in step S18 is unavailable from this point forward.

Therefore, it is possible to avoid abuse of the user authentication function of the information processing device 10 by a malicious attacker via an external apparatus.

Furthermore, in order to secure more safety, at the same time as cut-off of communication, the user authentication section of the information processing device 10 may call the registration section 12 and may delete or update the user key pair by performing communication with the server apparatus 30.

<Others>

In this embodiment, in the case where a user has lost the information processing device 10, the following processing may be performed. When the provider of the server apparatus 30 is notified of loss of the information processing device 10 from a user by telephone or the like, the provider makes service rejection setting with a specified user ID to the server apparatus 30. The server apparatus 30 then sends back authentication failure to the equipment 20, for instance, after the processing in step S42 in the user authentication processing. When the user finds the information processing device 10 and the provider of the server apparatus 30 is notified of the find from the user by telephone or the like, the provider cancels the service rejection setting with a specified user ID set to the server apparatus 30.

Also, when the model of the information processing device 10 is changed by a user and the provider of the server apparatus 30 is notified of the model change from the user by telephone or the like, the provider makes setting to allow update of the public key of the user with a specified user ID to the server apparatus 30. Thus, when a user has lost the information processing device 10, purchases a new information processing device 10, and requests for move, the service rejection setting is cancelled and the key or the entire set of keys associated with the user is updated so that continuous services may be received safely by the user. When it is detected that the information processing device 10 of a user is in a dangerous condition, based on the context notified from the information processing device 10, the server apparatus 30 may automatically make the service rejection setting.

Second Embodiment

In the first embodiment, the example, in which the equipment identification processing is performed between the information processing device 10 and the equipment 20 using NFC, has been described. In a second embodiment, an example, in which the equipment identification processing is performed between the information processing device 10 and the equipment 20 using BLE, will be described. It is to be noted that description is omitted as appropriate because the second embodiment is the same as the first embodiment except for part.

Hereinafter, the case in which the information processing device 10 is a master (host) and the equipment 20 is a slave (peripheral) will be described. For instance, the function of the master is implemented by a Generic Attribute Profile (GATT) client, the function of the slave is implemented by a GATT server, and the GATT server is provided with a characteristic area from or to which a challenge/token may be read or written. It is to be noted that needless to say, the equipment 20 may be a master (host) and the information processing device 10 may be a slave (peripheral).

<<Registration Processing>>

Figure 7:
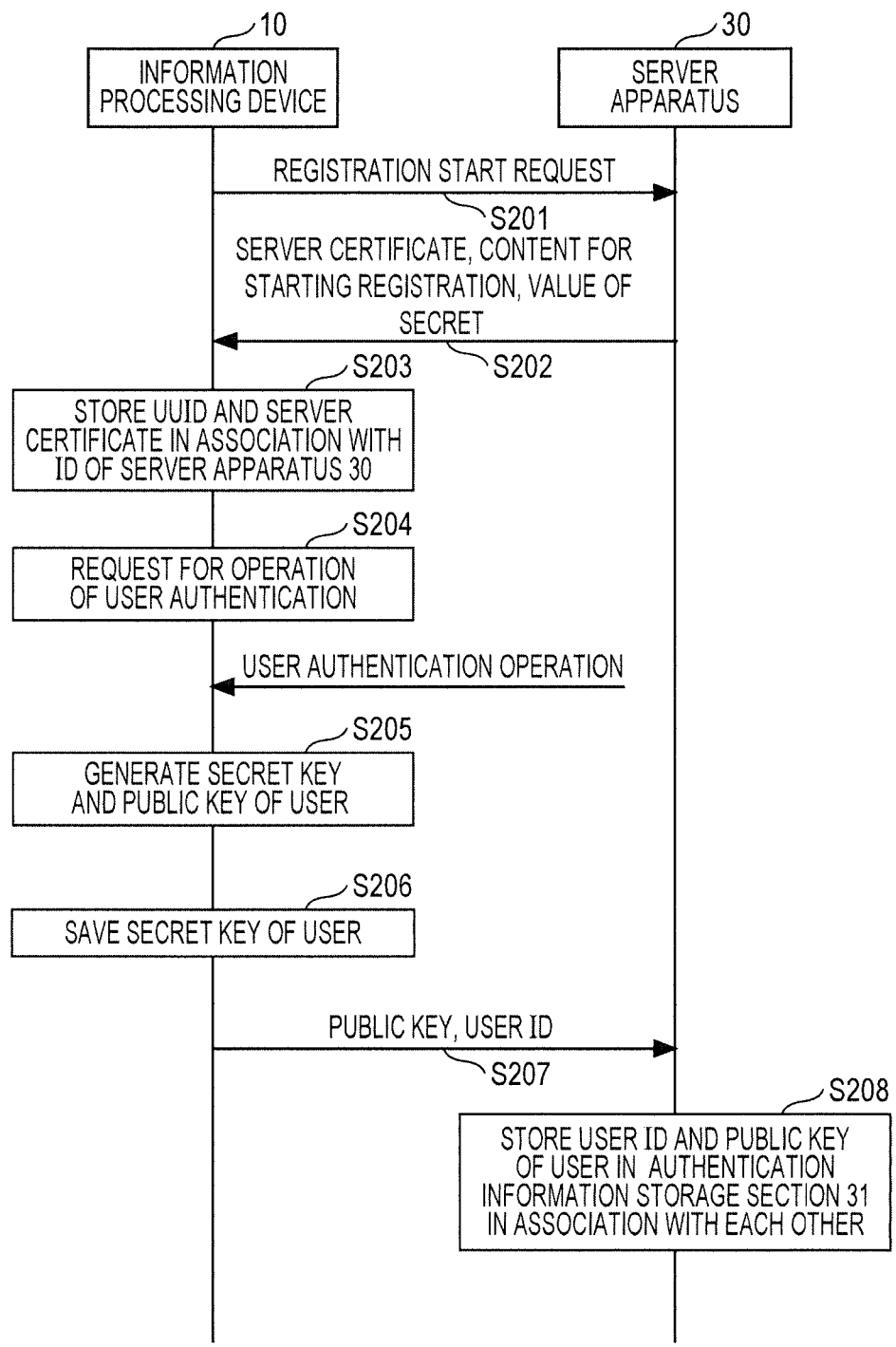
FIG. 7 is a sequence diagram illustrating an example of registration processing of an information processing system according to a second embodiment.

Next, the registration processing performed by the information processing system 1 according to the second embodiment will be described with reference to FIG. 7. FIG. 7 is a sequence diagram illustrating an example of the registration processing of the information processing system 1 according to the second embodiment.

The processing in step S201 is the same as the processing in step S1 of FIG. 4.

Subsequently, the server apparatus 30 transmits the server certificate of the server apparatus 30, the content for starting registration, and the value of secret randomly generated to the information processing device 10 (step S202).

Subsequently, the authentication processing section 13 of the information processing device 10 generates a UUID of a service using the received value of secret, and stores the UUID and the received server certificate in the authentication information storage section 11 in association with the server ID (for instance, the URL of the server apparatus 30) of the server apparatus 30 (step S203). Here, the UUID of a service may be, for instance, a bit sequence in which the hash value of server ID and the hash value of the value of secret are arranged.

The processing in steps S204 to S208 is the same as the processing in steps S4 to S8 of FIG. 4.

<<Equipment Identification Processing>>

Figure 8:
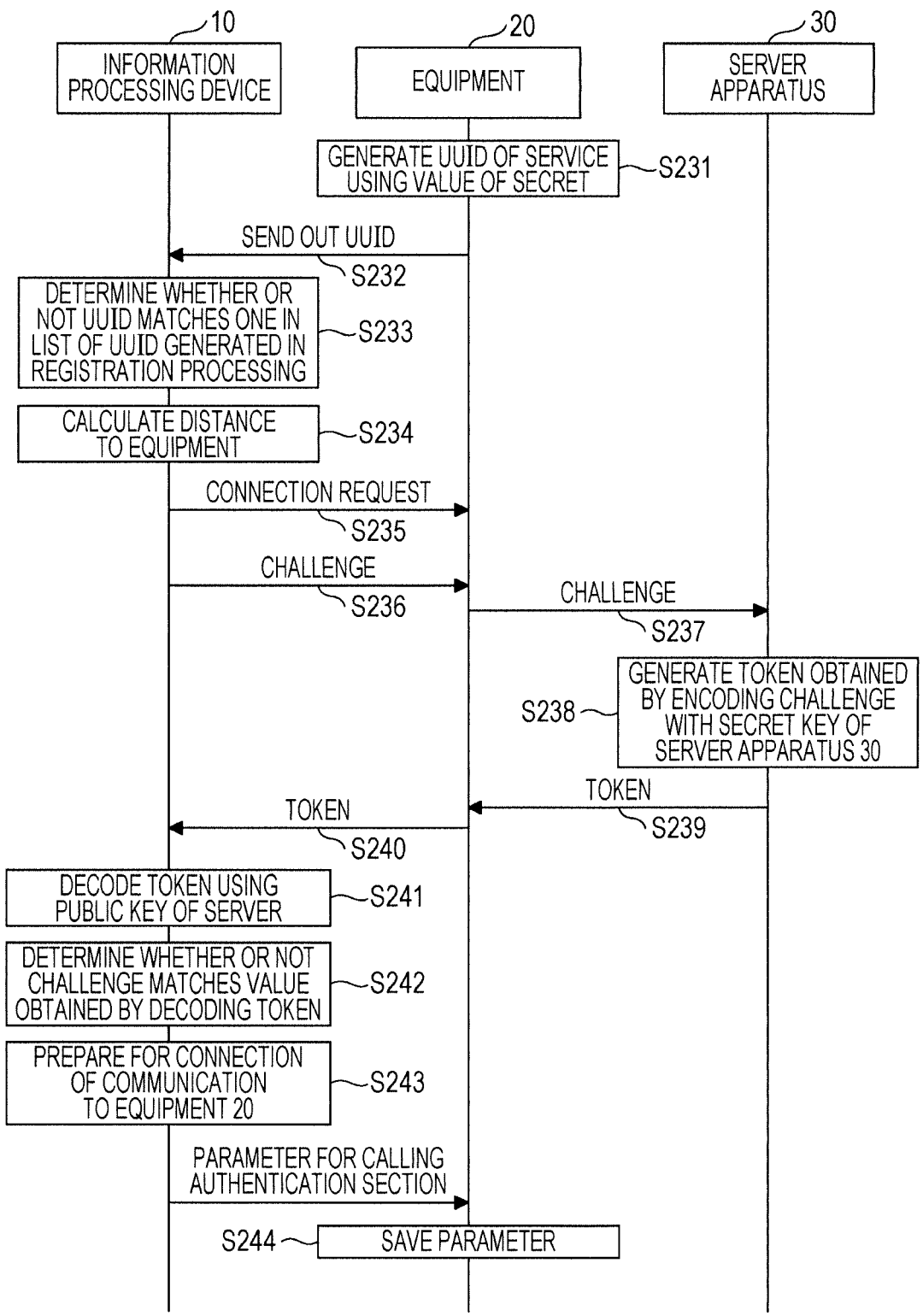
FIG. 8 is a sequence diagram illustrating an example of equipment identification processing of the information processing system according to the second embodiment.

Next, the equipment identification processing performed by the information processing system 1 according to the second embodiment will be described with reference to FIG. 8. FIG. 8 is a sequence diagram illustrating an example of the equipment identification processing of the information processing system 1 according to the second embodiment.

In step S231, the authentication processing section 21 of the equipment 20 generates a UUID of a service using the value of secret described above. It is to be noted that the value of secret described above is assumed to be pre-stored in the authentication processing section 21 of the equipment 20. Also, the method of generating a UUID is assumed to be the same as the generation method in step S203.

Subsequently, the authentication processing section 21 of the equipment 20 sets the generated UUID to the UUID of the service, uses the advertising (ADV) function of BLE communication, and sends out the UUID of the service with an advertising signal (step S232). It is to be noted that although the advertising signal may be sent out at regular intervals, in order to save power consumption, a human sensor or an illuminance sensor may be used to detect a human standing in front of the equipment 20, and the advertising signal may be sent out during a certain time period only.

Also, in addition to the UUID of the service, the advertising signal may include data of table indicating a relationship between radio wave power and distance, or transmitted radio wave power (TxPower).

Here, it is preferable that the power of radio waves transmitted be made weak so that the advertising signal may be received by only the information processing device 10 at point-blank range. For this reason, the radio wave power may be adjusted so that radio waves may not be received at a position 1 m or greater away, for instance.

Upon detecting reception of an advertising signal, the authentication processing section 13 of the information processing device 10 determines whether or not the UUID included in the advertising signal matches a UUID in the list of UUIDs generated in the registration processing (step S233).

When the determination indicates matching, the authentication processing section 13 of the information processing device 10 calculates the distance between the equipment 20 that sends out the advertising signal and the information processing device 10, based on the radio wave power (RSSI) received by the BLE communication, the data of table indicating a relationship between the radio wave power included in the advertising signal and distance, or the transmission radio wave power (TxPower) (step S234). When determining that the equipment 20 is near the information processing device 10, the authentication processing section 13 of the information processing device 10 stores a server ID corresponding to the UUID in a temporary buffer or the like, then transmits a connection request command to the equipment 20 by the BLE communication (step S235). It is to be noted that in step S233, when no UUID matches, or when it is determined that the equipment 20 is not located within a predetermined distance because the radio wave power is weak, the processing is ended.

Subsequently, when connection with equipment 20 is established, the authentication processing section 13 of the information processing device 10 writes the value of the challenge in a specific characteristic area of the GATT server of the authentication processing section 21 of the equipment 20 using the function of the GATT client (step S236).

Subsequently, when detecting that the challenge is written in the GATT server, the authentication processing section 21 of the equipment 20 transmits the challenge to the server apparatus 30 (step S237).

Subsequently, the server apparatus 30 generates a token obtained by encoding (signing) the received challenge with the secret key of the server apparatus 30 (step S238), and transmits the token to the equipment 20 (step S239).

Subsequently, the authentication processing section 21 of the equipment 20 writes the token in a specific area of the GATT server (step S240). When detecting that the token is written, the GATT server uses a notify command to notify the information processing device 10 by the BLE communication that the token has been written.

Subsequently, the authentication processing section 13 of the information processing device 10 reads the token from the equipment 20 by the BLE communication, and decodes the token using the public key of the server included in a server certificate associated with a server ID stored when the advertising signal is received (step S241).

Subsequently, the authentication processing section 13 of the information processing device 10 determines whether or not the above-described challenge and the value obtained by decoding the token match (step S242).

Subsequently, when the above-described challenge and the value obtained by decoding the token are matched, the authentication processing section 13 of the information processing device 10 determines that the equipment 20 corresponds to a registered server apparatus 30, and prepares for the connection of communication with the equipment 20 (step S243). It is to be noted that when the decoding has failed or when the challenge and the value obtained by decoding the response do not match, the processing is ended.

In step S243, the authentication processing section 13 of the information processing device 10 determines a communication system, parameters requested for communication, a module name for identifying the user authentication section 14 in the information processing device 10, and an ID (KeyID) for identifying the user authentication section 14 of the information processing device 10 in the equipment 20.

As a system of communication with the equipment 20, the communication by BLE may be used as is, or for instance, communication by IP via a network or another communication unit such as Bluetooth may be used. An appropriate system is selected by a communication unit owned by the information processing device 10 and the equipment 20. The selection method may be pre-determined by the information processing device 10 or may be specified by a server at the time of service registration, or the equipment 20 may specify a communication system along with the token at the same time by writing them in the GATT server of the information processing device 10.

When the communication by IP is selected as a communication system, the information processing device 10 opens a port for IP connection to set a connection standby state. Here, the number of port to be opened is preferably a random number to avoid reuse of the number.

Next, the information on the NFC tag is updated with the IP address, the port number of the information processing device 10, a module name (for instance, an application name of the authentication unit module in the case of Android OS) of an authentication unit, and a KeyID generated in associated with the authentication unit module are written in a specific characteristic area of the GATT server of the equipment 20.

Upon detecting the update of the tag information, the proximity communication section 22 of the equipment 20 reads the information on the updated tag, and saves the read information such as a KeyID, serving as a parameter for calling the user authentication section 14 (step S244). When a series of the processing is completed, a service application of the equipment 20 displays a service provision screen. It is to be noted that when the service application is not equipped with a screen, the service application may indicate a service start state, for instance, by turning on an LED attached to the equipment 20.

It is to be noted that in the second embodiment, in step S243, when the communication by IP is prepared, and the user authentication processing is performed by communication with IP, communication of BLE connected by the equipment identification processing may not be cut off and the connection may be maintained. In this case, since a received radio wave power (RSSI) is obtainable by each of the information processing device 10 and the equipment 20 while connection is made by BLE, increase in the distance between the information processing device 10 and the equipment 20 is detectable by reduction in the RSSI. Thus, when the RSSI falls below a predetermined threshold value, the information processing device 10 or the equipment 20 may cut off the communication by IP.

<Measures Against Man-in-the-middle Attack>

When the BLE is used as in the second embodiment, a man-in-the-middle attack may be performed in which the distance between the information processing device 10 and the equipment 20 is falsified using a device which obtains a signal sent out by the equipment 20 and relays the signal, and the proximity connection is taken over.

Figure 9:
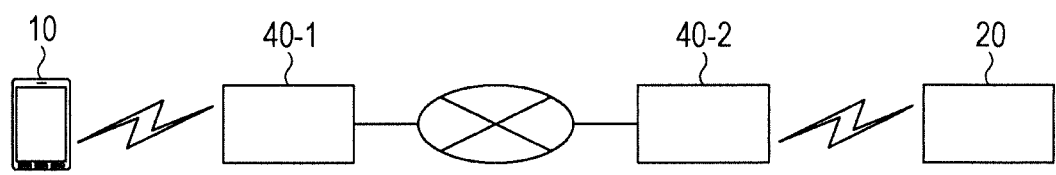
FIG. 9 is a diagram for explaining a man-in-the-middle attack.

FIG. 9 is a diagram for explaining a man-in-the-middle attack. For instance, an attacker installs BLE transmitting and receiving devices 40-1, 40-2 in front of the equipment 20 as illustrated in FIG. 9. The BLE transmitting and receiving device 40-2 receives a BLE signal sent out by the equipment 20. The BLE transmitting and receiving device 40-2 then copies the received signal data, and transmits the data to another BLE transmitting and receiving device 40-1 in a remote place, for instance, via the Internet.

The another BLE transmitting and receiving device 40-1 in a remote place sends out the copied BLE signal data. When the information processing device 10 is made close to the BLE transmitting and receiving device 40-1, the information processing device 10 receives a BLE signal with a higher radio wave power, and thus it is determined that the BLE signal sent out by the equipment 20 is close, and identification steps for the equipment 20 are started. The BLE signal sent out from the information processing device 10 is relayed by the two BLE transmitting and receiving devices 40-1, 40-2 and received by the equipment 20, and normal identification steps for the equipment 20 are established. Therefore, even though the user of the information processing device 10 is at a place away from the equipment 20, user authentication is successful and a service may be available. For this reason, the following processing may be performed.

The authentication processing section 13 of the information processing device 10 and the authentication processing section 21 of the equipment 20 record the radio wave power and the time in the BLE communication in time series. The authentication processing section 32 of the server apparatus 30 compares and verifies the communication state data transmitted from the information processing device 10 and the equipment 20.

It is to be noted that the authentication processing section 13 of the information processing device 10 and the authentication processing section 21 of the equipment 20 each record a history of the transmitted radio wave power and the received radio wave power in the BLE communication in associated with time at regular intervals since the start time of BLE connection in the equipment identification processing. It is to be noted that timers used for time acquisition are preferably synchronized between the information processing device 10 and the equipment 20.

Figure 10:
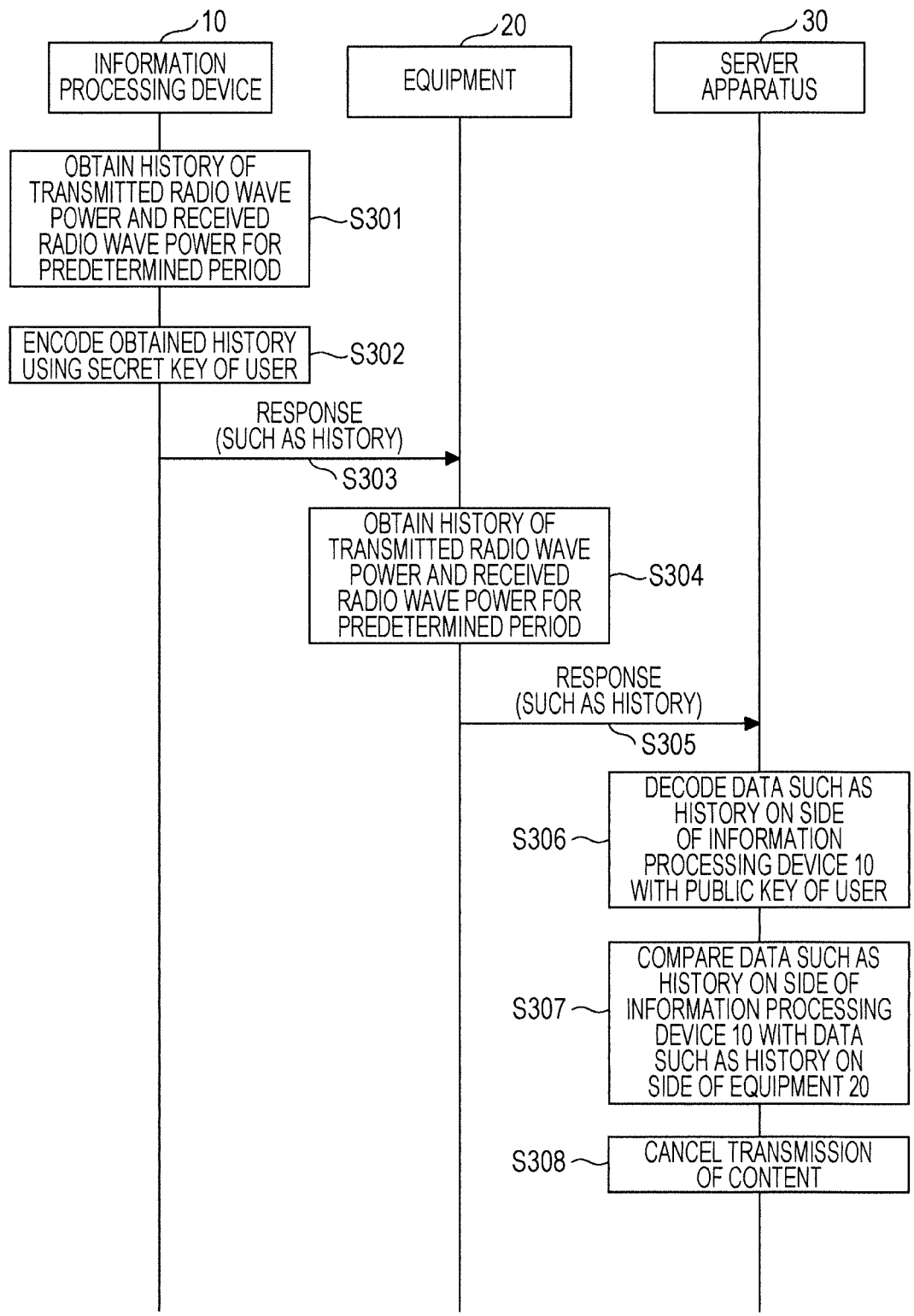
FIG. 10 is a sequence diagram illustrating an example of processing of measures against a man-in-the-middle attack of an information processing system according to the second embodiment.

Next, the measures against a man-in-the-middle attack taken by the information processing system 1 according to the second embodiment will be described with reference to FIG. 10. FIG. 10 is a sequence diagram illustrating an example of processing of measures against a man-in-the-middle attack taken by the information processing system 1 according to the second embodiment.

The following processing is executed while the processing in steps S38 to S44 of FIG. 6 is performed. A description will be given under the assumption that the processing up to step S37 of FIG. 6 is completed.

In step S301, when returning a response in step S38 of FIG. 6, the authentication processing section 13 of the information processing device 10 obtains the history of the transmitted radio wave power and the received radio wave power for a predetermined period.

Subsequently, the authentication processing section 13 of the information processing device 10 encodes (signs) data including the history, the module ID of a module that makes IP connection, and an IP address and a port number in a connection standby state with the secret key of the user (step S302), and adds the data to the response and transmits all the data to the equipment 20 (step S303).

Subsequently, similarly to the information processing device 10, the authentication processing section 21 of the equipment 20 obtains the history of the transmitted radio wave power and the received radio wave power for a predetermined period (step S304).

Subsequently, the authentication processing section 21 of the equipment 20 adds the history, and an IP address and a port number at a connection destination of the IP communication with the information processing device 10 to the received response, and transmits all the data to the server apparatus 30 (step S305).

The authentication processing section 32 of the server apparatus 30 decodes data such as the history on the side of the information processing device 10 with the public key of the user (step S306), compares data such as the history on the side of the information processing device 10 with data such as the history on the side of the equipment 20 (step S307), and when a difference between both data is a predetermined threshold value or greater, it is determined that a man-in-the-middle is present, and transmission of the content from the server apparatus 30 to the equipment 20 is not performed in step S43 of FIG. 6 (step S308).

As a comparison method for communication state data, an estimated distance is calculated based on, for instance, the transmitted radio wave intensity on one side and the received radio wave power on the other side at the same time. When a certain number or greater difference is present between the distances calculated on the side of the information processing device 10 and on the side of the equipment 20 at the same time, it is presumed that a difference occurs between the distances recognized by both sides, and it is determined that a man-in-the-middle is present.

Since the received radio wave power significantly varies according to the ambient environment, and an error in a calculated distance is relatively large, when multiple samples of time are taken and a difference occurs between in a certain proportion or greater of the samples (for instance, when 100 pieces of data are collected by taking one piece of data every second, and 1 m or greater difference occurs between distances in 80% or more of the data), it may be determined that a man-in-the-middle is present. Also, when a calculated distance indicates an impossible numerical value such as 10 m, it may be determined that a man-in-the-middle is present.

It is to be noted that when the distances between the BLE transmitting and receiving device, and the equipment 20, the information processing device 10 are skillfully manipulated and matched by a man-in-the-middle, presence of a man-in-the-middle may not be detected by the above determination method. Thus, the radio wave sent out by the equipment 20 in the BLE communication may be alternately stronger and weaker at a certain period. In this case, even when the distances from each BLE transmitting and receiving device are skillfully matched by a man-in-the-middle, a periodic change occurs in the radio wave power. Therefore, when no man-in-the-middle is present, a waveform obtained by plotting measured values of the received radio wave power at times on the side of the information processing device 10 is supposed to be almost the same as a waveform obtained by plotting measured values of the transmitted radio wave power at times on the side of the equipment 20. Thus, a degree of isomorphism between both waveforms is calculated, and when the degree of isomorphism is a certain reference value or lower, it may be determined that a man-in-the-middle is present and authentication may be rejected.

Also, in the case where an attacker also performs a man-in-the-middle attack on the connection by the IP communication, it is highly probable that the IP address, the port number of the IP connection server located in the middle are different from the IP address, the port number for which the IP connection module on the side of the information processing device 10 is on standby. In this case, presence of a man-in-the-middle is detectable by comparing the connection IP addresses and the port numbers included in both communication state data.

Thus, presence of a man-in-the-middle is detectable, and the user authentication may be prohibited when the equipment 20 and the information processing device 10 are away from each other.

<<User Authentication Processing>>

Next, the user authentication processing performed by the information processing system 1 according to the second embodiment will be described. Although the user authentication processing in the second embodiment is similar to the user authentication processing in the first embodiment illustrated in FIG. 6, the information included in the status information is different. For instance, in the user authentication processing in the second embodiment, instead of a time when the NFC tag is read in the first embodiment, a time of BLE connection and a UUID may be used.

Third Embodiment

In a third embodiment, an example, in which the information processing system 1 according to the first or second embodiment is applied to a home delivery service using a delivery box, will be described. Specifically, in the third embodiment, an example, in which the equipment 20 is a delivery box, which may be opened with a smartphone or the like, will be described. It is to be noted that description is omitted as appropriate because the third embodiment is the same as the first or second embodiment except for part. Hereinafter, the difference between the third embodiment and the first or second embodiment will be described.

Multiple devices 20 (delivery boxes) according to the third embodiment are installed, for instance, in an apartment building, and each equipment 20 is assigned a number. Also, all the delivery boxes are connected to a communication line via a router in the apartment building, and are in a communicable state via a network with the server apparatus 30 that provides a facility management service at a remote place managed by an apartment management company.

<Functional Configuration>

Figure 11:
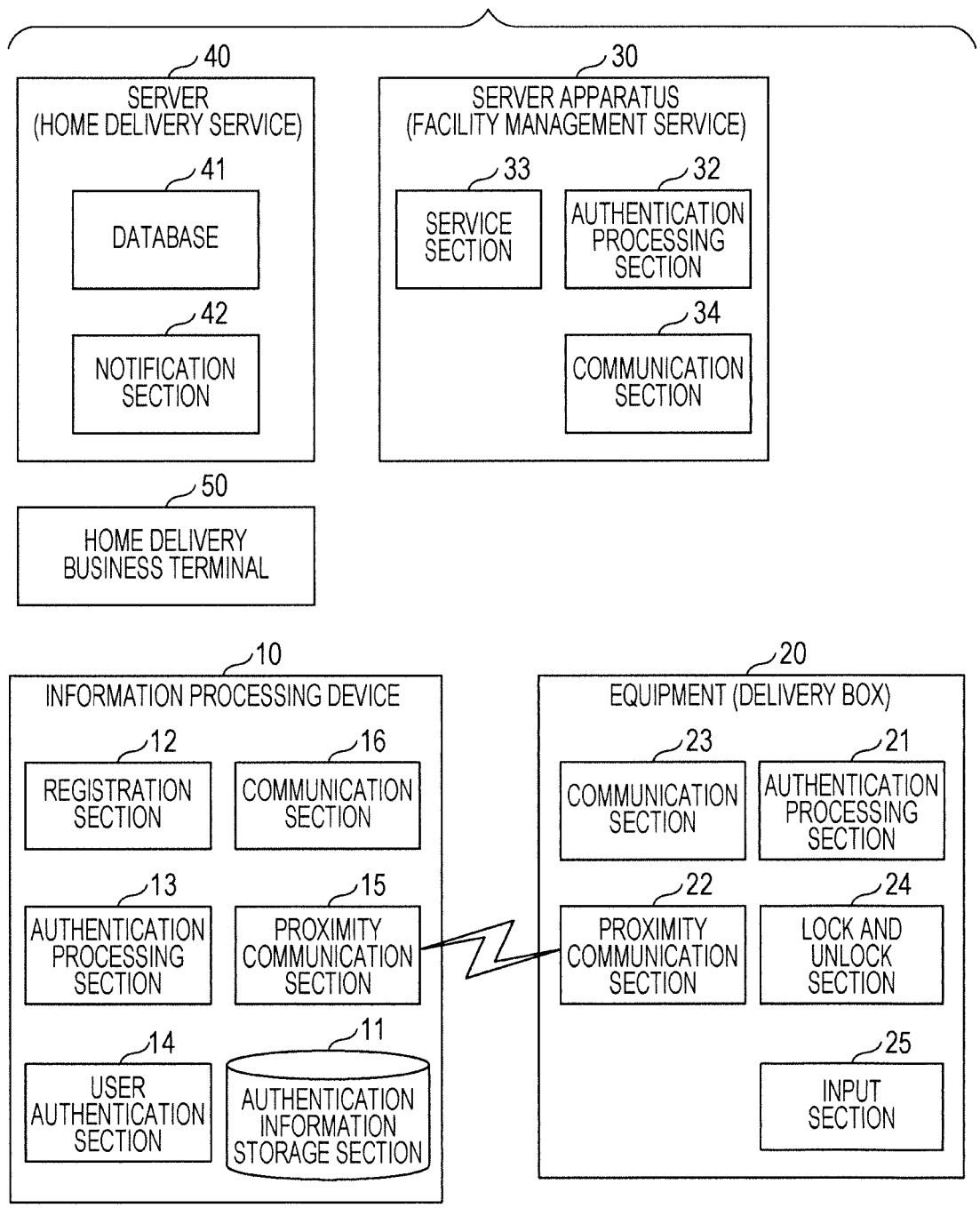
FIG. 11 is a diagram illustrating an example functional configuration of an information processing system according to a third embodiment.

Next, the functional configuration of an information processing system according to the third embodiment will be described with reference to FIG. 11. FIG. 11 is a diagram illustrating an example functional configuration of the information processing system according to the third embodiment.

The equipment 20 (delivery box) according to the third embodiment further includes a lock and unlock section 24, and an input section 25.

The lock and unlock section 24 makes locking and unlocking of the equipment 20 (delivery box). The equipment 20 (delivery box) is unlocked when it contains no package, and so anyone may open the delivery box and put a package. When a package is put inside and the lid is closed, the delivery box is automatically locked.

When receiving an unlocking instruction via a communication line from the server apparatus 30 that provides the facility management service, the lock and unlock section 24 unlocks the delivery box.

The input section 25 receives input of a delivery number, for instance, with a ten key.

It is to be noted that the equipment 20 (delivery box) according to the third embodiment may use, for instance, an NFC reader as an interface device.

A server 40 which provides a home delivery service is a system that performs collection and delivery management of home delivery packages, and the server 40 communicates with a home delivery business terminal 50 owned by a home delivery company, and holds the delivery status of each delivery package.

A database 41 of the server 40 stores information on users and information on delivery of packages.

When a package is stored in the equipment 20 (delivery box), a notification section 42 of the server 40 receives the delivery number of the package and the number of the equipment 20 (delivery box) from the home delivery business terminal 50.

The notification section 42 of the server 40 notifies a user's information processing device 10 at a package destination of the number of the equipment 20 (delivery box) and the delivery number of the package based on the information received from the home delivery business terminal 50. When a package is stored in the equipment 20 (delivery box), the notification section 42 of the server 40 also notifies the server apparatus 30 of the user name (user ID) of a user at a package destination and the delivery number. The home delivery business terminal 50 is equipped with a bar code reader that reads a bar code printed on a package, and a touch panel display for displaying and inputting a home delivery status. When a package is stored in the equipment 20 (delivery box), the home delivery business terminal 50 transmits the delivery number of the package and the number of the equipment 20 (delivery box) to the server 40.

After the information processing device 10 owned by a resident of an apartment building is pre-registered for use of the facility management service, the resident is allowed to perform an operation of unlocking the home delivery box. It is to be noted that the information processing device 10 may be provided with a biometric authentication device such as a fingerprint authentication or iris authentication device.

The service section 33 of the server apparatus 30 according to the third embodiment provides a service such as the facility management service for an apartment building.

<Processing>

Next, the processing performed by the information processing system 1 according to the third embodiment will be described with reference to FIGS. 4, 5, 6. Hereinafter, the steps from arrival of a package to take out of the package will be described.

<<Registration Processing (Preparation for Service Use)>>

In step S1 of FIG. 4, before a service is utilized, a resident of an apartment building accesses the facility management service of the apartment building by a browser of the information processing device 10, and displays a use registration screen.

Subsequently, in step S2, the server apparatus 30 which provides the facility management service sends a server certificate of itself to the information processing device 10.

Subsequently, in step S3, the URL of the server and the server certificate are stored in the authentication information storage section 11 in association with each other.

Subsequently, the user inputs a name, an address, a telephone number, an email address, etc. to the use registration screen, and when a registration button is pressed, those pieces of information are transmitted to the server apparatus 30 of the facility management service. When the server which has received the information recognizes that the data of the user is not in the own database, the server issues a unique user ID and registers the data in the database in association with the user ID.

Next, the server apparatus 30 which provides the facility management service transmits a screen requesting user authentication to the browser.

Subsequently, in step S4, a screen prompting the browser of the information processing device 10 to perform authentication is displayed. When a user performs biometric authentication by fingerprint or iris in this state, the user authentication section 14 verifies whether or not the biometric information is correct, and when the authentication is successful, a key pair of the user is generated in step S5.

Subsequently, in step S6, a secret key is saved in associated with the URL of the server.

Subsequently, in step S7, the user ID and the user public key along with a user registration request are transmitted to the server apparatus 30 of the facility management service.

Subsequently, in step S7, the user ID and the user key are registered in the database of the server apparatus 30 in association with each other.

Furthermore, the user also makes the registration for use of notification service for the home delivery service from the browser of the information processing device 10. In the use registration, user registration is made using a typical ID/password, and information of the user such as a name, an address, a telephone number, an email address is also registered, and those pieces of information are recorded in the database 41 of the server 40 of the home delivery service.

<<Equipment Identification Processing, User Authentication Processing (Service Use)>>

A home delivery company selects one of the devices 20 (delivery boxes), and puts a package and closes the lid. At this point, the lid is automatically closed. The home-delivery company has read a bar code pre-printed on a package by the bar code reader of the home delivery business terminal 50, and a home delivery status of the package is displayed on the screen. The number of the equipment 20 (delivery box) which stores the package is inputted on the home delivery status screen, and when an input completion button in the screen is pressed, the delivery number of the package and the number of the equipment 20 (delivery box) are transmitted to the server 40 of the home delivery service.

Upon receiving the above-mentioned information, the notification section 42 of the server 40 obtains the information on a destination user associated with the package number from the database 41, and an email including the delivery number of the package and the number of the equipment 20 (delivery box) which stores the package is transmitted to an email address of the user included in the information. In addition, the URL of the server apparatus 30, which provides the facility management service at the address of the user, is also obtained from the database 41. The above-mentioned URL is an API that registers a use record of the equipment 20 (delivery box) of the facility management service, and when the user name, the delivery number, and the URL (the URL of the home delivery service) of a notification destination for reception confirmation are transmitted to the above-mentioned URL, the information is recorded in the database of the server apparatus 30 as the storage information of the equipment 20 (delivery box).

The user receives the above-mentioned email by the information processing device 10, and is informed of the delivery of a package. Later, when the user goes home in the apartment building and touches the NFC reader of the equipment 20 (delivery box) with the number listed in the email, the equipment identification processing of FIG. 6 is performed.

In the case of this embodiment, the equipment 20 (delivery box) does not have a screen, however, after completion of the equipment identification processing, the equipment 20 is in an input standby state for a delivery number. The user inputs the delivery number notified by an email via a ten key or the like. When the input is completed, in step S31 of FIG. 6, the equipment 20 (delivery box) transmits an unlocking request for the equipment 20 (delivery box) along with the delivery number to the server apparatus 30.

Subsequently, in step S32, the server apparatus 30 sends back an authentication request and the second challenge for the received unlocking request, and refers to the database to obtain a user name corresponding to the delivery number and obtains the public key of the user.

Subsequently, the processing in steps S33 to S42 is performed, and when the authentication is successful, an unlocking command is transmitted from the server apparatus 30 to the equipment 20 (delivery box) in step S43. This sets the equipment 20 (delivery box) to an openable state.

Subsequently, when the package is taken out and the lid is closed, the equipment 20 (delivery box) transmits a reception completion notification to the server apparatus 30 of the facility management service. The server apparatus 30 of the facility management service obtains a reception completion notification destination URL of the home delivery service from the storage information on the equipment 20 (delivery box), recorded in the database, transmits the reception completion notification to the URL, and subsequently, deletes the storage information on the equipment 20 (delivery box) from the database. The server of the home delivery service, which has received the reception completion notification, records that reception of delivery is completed, and ends the service.

It is to be noted that although the user inputs the delivery number to the equipment 20 (delivery box) in the above-mentioned steps, when a database, which stores user information, is sharable between the server 40 of the home delivery service and the server apparatus 30 of the facility management service, input of a delivery number is unrequested. The server apparatus 30 of the facility management service directly obtains the user name owned by the home delivery service based on the number of the equipment 20 (delivery box), thereby making it possible to identify the user of at a delivery destination. Also, the equipment 20 (delivery box) may be provided with a bar code reader instead of a ten key, and a bar code in which a delivery number is recorded may be added to a delivery notification email received by a user. In this case, the bar code displayed on the email is read by the bar code reader, the read information is sent to the server apparatus 30, and thereby the server apparatus 30 may recognize the delivery information. Thus, the user is able to unlock the delivery box by the information processing device 10 such as a smartphone without inputting a password or the like.

It is to be noted that this embodiment is not limited to the home delivery service, and is applicable to a case where a service that requests user authentication (the facility management service in this embodiment), and a service that requests no user authentication (the home delivery service in this embodiment) share a single device.

Fourth Embodiment

In a fourth embodiment, an example, in which the information processing system 1 according to the first or second embodiment is applied to a rental car or a car-sharing service, will be described. Specifically, in the fourth embodiment, an example will be described, in which the equipment 20 is a vehicle and it is possible to provide an insurance service suitable to a user by providing a cockpit screen according to the user and classifying the operation information into user by user. It is to be noted that description is omitted as appropriate because the fourth embodiment is the same as the first or second embodiment except for part. Hereinafter, the difference between the fourth embodiment and the first or second embodiment will be described.

<Functional Configuration>

Figure 12:
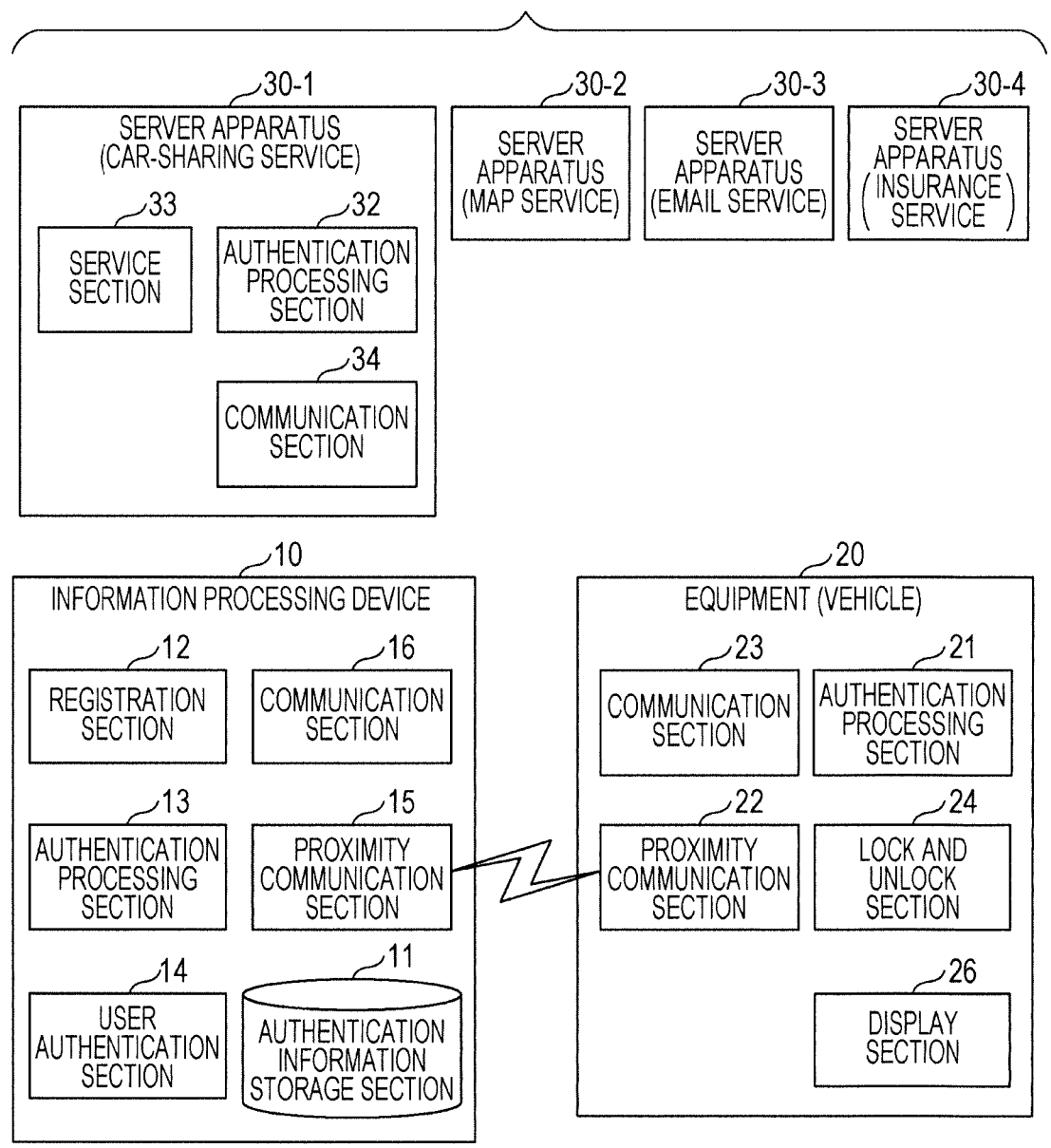
FIG. 12 is a diagram illustrating an example functional configuration of an information processing system according to a fourth embodiment.

Next, the functional configuration of the information processing system according to a fourth embodiment will be described with reference to FIG. 12. FIG. 12 is a diagram illustrating an example functional configuration of the information processing system according to the fourth embodiment.

The equipment 20 (vehicle) according to the fourth embodiment further includes a lock and unlock section 24, and a display section 26.

The lock and unlock section 24 makes locking and unlocking of the equipment 20 (vehicle).

When receiving an unlocking instruction via a communication line from the server apparatus 30 that provides a car-sharing service, the lock and unlock section 24 unlocks a key.

The display section 26 displays on a screen information obtained from the server apparatuses 30-1, 30-2, . . . (hereinafter simply referred to as the "server apparatus 30" when the apparatuses are not distinguished) that provide various services. The display section 26 displays data on a vehicle information display screen that obtains, for instance, a speedometer and a gasoline gauge provided in the cockpit of the equipment 20 (vehicle) from an in-vehicle system such as an engine control unit (ECU), and on a service information display screen that displays a navigation map or entertainment information.

The server apparatus 30-1 provides a car-sharing service. The service section 33 of the server apparatus 30-1 manages information on rental vehicles and users, and manages locking of the rental vehicles, grasps a rental situation, and provides user-oriented service.

The server apparatus 30-2 provides a map service. The service section 33 of the server apparatus 30-2 distributes map information customized for each user.

The server apparatus 30-3 provides an email service. The service section 33 of the server apparatus 30-3 distributes emails customized for each user.

The server apparatus 30-4 provides an insurance service. The service section 33 of the server apparatus 30-4 provides a user with insurance when a vehicle is rented. The service section 33 of the server apparatus 30-4 calculates insurance fees for each user based on the driving history of the user.

It is to be noted that each of these server apparatuses 30-1, 30-2, 30-3, 30-4 is able to perform the above-described registration processing, equipment identification processing, and user authentication processing.

<Processing>

Next, the processing performed by the information processing system 1 according to the fourth embodiment will be described. It is to be noted that the registration processing of FIG. 4 is assumed to be completed for each of the server apparatuses 30-1, 30-2, 30-3, 30-4.

A user accesses the server apparatus 30-1 of car-sharing service using the browser of the information processing device 10, for instance, at home, and makes rental registration of the equipment 20 (vehicle).

In the rental registration, a date, a period, on or in which the equipment 20 (vehicle) is rented, a vehicle type of choice, a rental location, information on the driver, a list of services to be displayed on the cockpit, and a request specifying a display pattern of the equipment 20 (vehicle) information are transmitted. The service section 33 of the server apparatus 30-1 searches the database of the car-sharing service, selects available devices 20 (vehicles), calculates respective fees, and presents the information to the user of the information processing device 10. When the user agrees with the conditions such as fees and an OK button displayed on the screen of the information processing device 10 is pressed, the rental registration is completed. When the rental registration is completed, the service section 33 of the server apparatus 30-1 records information on the rental registration in the database in association with the user information.

After a rental start time, the user may use the equipment 20 (vehicle) for which rental registration is made, and when the user holds the information processing device 10 over an NFC reader or the like of the equipment 20 (vehicle), in step S12 of FIG. 5, the equipment 20 (vehicle) reads a challenge transmitted from the information processing device 10, and transmits the ID of the equipment 20 (vehicle), the challenge, and an unlocking request to the server apparatus 30-1.

The server apparatus 30-1 uses the ID of the equipment 20 (vehicle) as a key, and obtains the user ID of the user from the rental registration information. The server apparatus 30-1 uses the public key of the user obtainable from the obtained user ID, and performs unlocking processing for the equipment 20 (vehicle) in accordance with the steps same as the unlocking steps for the key of a delivery box described in the third embodiment.

When the user gets on the equipment 20 (vehicle) and starts the engine, in order to display a cockpit screen and service information, the display unit 26 requests the server apparatus 30-2 that provides a map service and the server apparatus 30-3 that provides an email service for screen display information. Each of the server apparatus 30-2 and the server apparatus 30-3 transmits a user authentication request to the information processing device 10, and performs the user authentication processing in the same manner as in the above-described embodiments.

When the user authentication is successful, the server apparatus 30-2 and the server apparatus 30-3 obtain the service list specified at the time of rental registration from the database, and transmits screen information including a link to the content of each applicable service, and a display pattern ID of the vehicle information display screen to the information processing device 10. Here, since it is known that the content of the car-sharing service includes a link to the service content for which user authentication has to be performed, when the authentication processing section 21 of the equipment 20 (vehicle) requests the information processing device 10 for user authentication, the authentication processing section 21 transmits the continuation flag information along with the challenge, and the information processing device 10 records the continuation flag information. It is to be noted that when a certain time period elapses, the flag information is erased.

Upon receiving the screen information, the display section 26 first displays a screen corresponding to the display pattern ID of the vehicle information display screen. Next, in order to display the screen information including a link to the content of each of various services, the display section 26 transmits a content acquisition request to the server apparatus 30-2 and the server apparatus 30-3. The server apparatus 30-2 and the server apparatus 30-3, which have received the content acquisition request, send back a user authentication request along with the challenge to the information processing device 10 because the user authentication has to be performed.

The challenges transmitted by the server apparatus 30-2 and the server apparatus 30-3 have different values. The information processing device 10, which has received a user authentication request from each of various services, generates a correspondence table between the URL of each of the server apparatus 30-2 and the server apparatus 30-3, and the value of each challenge, and transmits the correspondence table along with the authentication request to the equipment 20.

The equipment 20 rewrites the correspondence table in which the URL of each of the server apparatus 30-2 and the server apparatus 30-3 is converted to a KeyID, and obtains a response value from the information processing device 10. In this process, when connection, authentication, and cut-off is performed for each service, the user operation is cumbersome, the correspondence table in which pairs of a KeyID and a challenge are recorded in single connection along with the above-mentioned continuation flag information is transmitted to the information processing device 10.

The information processing device 10 compares the continuation flag information with the continuation flag information previously received and recorded, and when matching occurs, skips the processing of biometric authentication, and encodes each challenge with the user secret key corresponding to the service in accordance with each entry in the correspondence table, and calculates a response value. When a response value is calculated for each entry in the correspondence table, a correspondence table is generated, in which pairs of a KeyID and a response are recorded. Each KeyID in the response correspondence table is then converted to a server ID, and a response value recorded in the correspondence table is sent back to each of the server apparatus 30-2 and the server apparatus 30-3 which have requested authentication.

The server apparatus 30-2 and the server apparatus 30-3, which have each received a response value, verify whether or not the response value is correct, and when the authentication is successful, transmits a content corresponding to the user.

A content corresponding to the user is such that for the map service, for instance, the home of the user, a favorite route, map information accompanied by pre-registered destination information, and for the email service, for instance, information on received emails of the user or the number of unread emails. Alternatively, a content corresponding to the user may be entertainment-related content such as video or music, or social-related content such as SNS.

With the configuration described above, even when the services provided by multiple server apparatuses 30 are present in mix, content is obtainable from each of the multiple server apparatuses 30 by a single user authentication operation without repeatedly requesting the user for authentication.

It is to be noted that in the example described above, a user authentication operation is requested for two times at the time of unlocking the equipment 20 (vehicle) and at the time of screen display. However, if the information processing device 10 stores the continuation flag information at the time of key unlocking, a series of operations may be performed by a single user authentication operation.

Furthermore, when a vehicle information display screen is generated, the display section 26 may obtain information such as openings of the accelerator, the brake, a steering angle from in-vehicle equipment, and may regularly notify the server apparatus 30-1 providing the car-sharing service of the information. In this case, since the server apparatus 30-1 may identify a user who currently utilizes the equipment 20 (vehicle), the user ID may be added to the transmitted information, which may be saved in the database. Thus, when data analysis is conducted later, the operation information may be classified by the users of the equipment 20 (vehicle), and it is easy to analyze the tendency of operations by users. For instance, the user who is currently operating has small amounts of change in the accelerator, the brake, the steering wheel, and an analysis result that the user tends to perform a safety operation is determined, and the resultant information is provided to the server apparatus 30-4 of the insurance service.

The server apparatus 30-4 of the insurance service provides reduced insurance fees at the time of next rental in consideration of the record of safe driving of the user, which may cause the level of satisfaction of the user to be improved. Alternatively, the analysis result may be directly transmitted to the equipment 20 (vehicle), and the display section 26 may be caused to display information as to whether or not the current operation is safe driving.

It is to be noted that this embodiment is not limited to a rental car or a car-sharing service, and is applicable to a case where multiple services that request user authentication are provided by a single device.

Fifth Embodiment

In a fifth embodiment, an example, in which the information processing system 1 according to the first or second embodiment is applied to a financial service, will be described. Specifically, in the fifth embodiment, an example, in which the equipment 20 is an ATM, and online banking and the ATM may be authenticated and utilized using the same information processing device 10, will be described. It is to be noted that description is omitted as appropriate because the fifth embodiment is the same as the first or second embodiment except for part. Hereinafter, the difference between the fifth embodiment and the first or second embodiment will be described.

<Functional Configuration>

Figure 13:
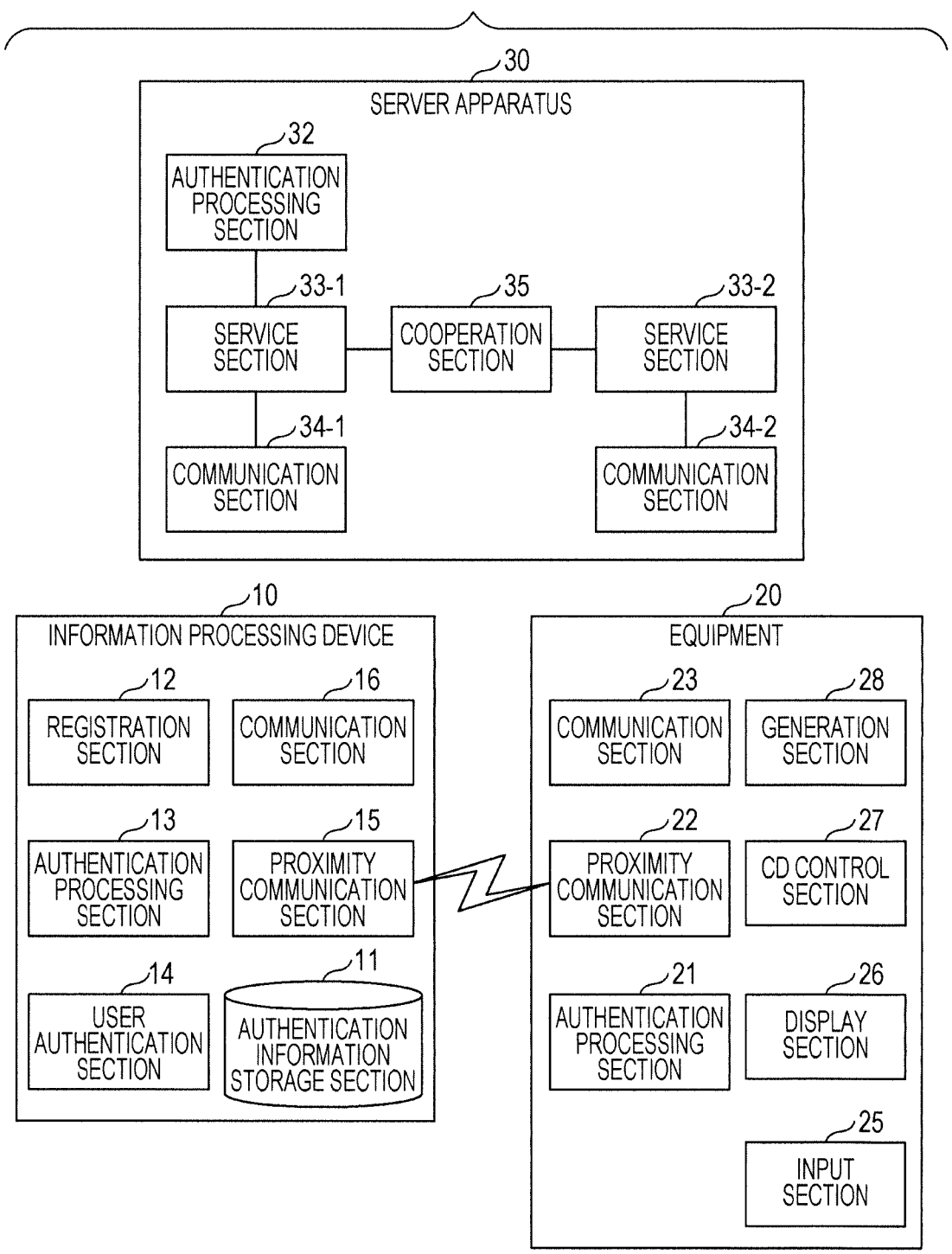
FIG. 13 is a diagram illustrating an example functional configuration of an information processing system according to a fifth embodiment.

Next, the functional configuration of the information processing system according to the fifth embodiment will be described with reference to FIG. 13. FIG. 13 is a diagram illustrating an example functional configuration of the information processing system according to the fifth embodiment.

The server apparatus 30 according to the fifth embodiment provides a service such as financial services.

The server apparatus 30 has a communication section 34-1, a communication section 34-2, a service section 33-1, a service section 33-2, and a cooperation section 35.

The service section 33-1 provides online banking service which allows transfer or inquiry for balance with the information processing device 10.

The service section 33-2 provides ATM service that manages withdrawals and deposits via the equipment 20 (ATM).

The cooperation section 35 causes the service section 33-1 and the service section 33-2 to cooperate with each other. With the cooperation section 35, the service section 33-1 of the online banking service and the service section 33-2 of the ATM service share a customer database for managing customer information and an account database for managing withdrawals and deposits from and to a customer account.

The service section 33-1 of the online banking service is accessed from the information processing device 10 via the communication section 34-1, for instance, through the Internet or the like, and the service section 33-2 of the ATM service is accessed from the information processing device 10 via the communication section 34-2, for instance, through a dedicated line.

The fifth embodiment significantly differs from the first embodiment or the second embodiment in that the service section 33-1 that performs the above-described registration processing is different from the service section 33-2 that provides a service for ATM use. In the fifth embodiment, communication for authentication is relayed from the service section 33-2 to the service section 33-1 by the cooperation section 35, and thus the user is allowed to utilize the same authentication method for the ATM service and the online banking service.

It is to be noted that the server apparatus 30 may be implemented by cloud computing including multiple computers. In this case, the computer of the service section 33-1 that performs the above-described registration processing may be different from the computer of the service section 33-2 that performs the above-described equipment identification processing and user authentication processing. For instance, the above-described registration processing may be performed by the service section 33-1 that provides the online banking service, and the above-described equipment identification processing and user authentication processing may be performed by the service section 33-2 that provides the ATM service when the user utilizes the equipment 20 (ATM). In this case, communication from the information processing device 10 for user authentication is relayed from the service section 33-2 that provides the ATM service to the service section 33-1 that provides the online banking service by the cooperation section 35.

The equipment 20 (ATM) according to the fifth embodiment further includes an input section 25, a display section 26, a CD control section 27, and a generation section 28.

The input section 25 receives an operation from a user, for instance, via a touch panel display.

The display section 26 displays a screen such as a menu of the ATM

The CD control section 27 controls a cash dispenser (CD) to allow withdrawal of cash.

The generation section 28 generates transaction data in which transaction of the ATM is coded.

<Processing>

Next, the processing performed by the information processing system 1 according to the fifth embodiment will be described with reference to FIG. 4, FIG. 5, FIG. 6.

<<Registration Processing (Preparation for Service Use)>>

In step S1 of FIG. 4, before a service is utilized, the user accesses the service section 33-1 that provides the online banking service by a banking application or a browser of the information processing device 10, and performs the user registration. Subsequently, the processing in step S2 to step S8 is performed. It is to be noted that at the time user registration, let the user select whether or not the equipment 20 (ATM) is also utilized, and when the user selects that the equipment 20 (ATM) is utilized, an option that the user is allowed to utilize the equipment 20 (ATM) is recorded in the server apparatus 30.

<<Equipment Identification Processing>>

When a user presses "transaction start" button on the screen of the equipment 20 (ATM), the equipment 20 (ATM) displays a message such as "Please place your smartphone on the ATM" to prompt the user to make the information processing device 10 closer to the equipment 20 (ATM). When the information processing device 10 is made closer to the equipment 20 (ATM), the equipment identification processing and the user authentication processing are performed.

Hereinafter, the difference between the equipment identification processing and the user authentication processing according to the fifth embodiment and those according to the first embodiment will be described.

In step S12 of FIG. 5, the service section 33-2 of the ATM service, which has received a challenge from the equipment 20 (ATM), transmits a request for token generation along with the received challenge to the service section 33-1 of the online banking service via the cooperation section 35. In step S13 of FIG. 5, the service section 33-1 of the online banking service generates a token using a server certificate.

In step S14 of FIG. 5, the generated token is sent back to the service section 33-2 of the ATM service, and the service section 33-2 of the ATM service sends back the token along with the server ID of the service section 33-1 of the online banking service to the equipment 20 (ATM). In step S15 of FIG. 5, the equipment 20 (ATM) returns the server ID and the token to the information processing device 10.

Since the information processing device 10 receives the token signed (encoded with the secret key of the server apparatus 30) by the server apparatus 30 which has performed above-described registration processing, performing the processing in step S16 to step S18 of FIG. 5 allows the equipment 20 (ATM) to be authenticated using the server certificate of the server apparatus 30 owned by the information processing device 10.

<<User Authentication Processing>>

Subsequently, the processing in step S31 to step S38 of FIG. 6 is performed, and in step S39 of FIG. 6, the service section 33-2 of the ATM service receives a response from the equipment 20 (ATM).

When both the online banking service and the ATM service are set to be available by a user at the time user registration, the service section 33-2 of the ATM service transmits a request for response verification to the service section 33-1 of the online banking service.

In step S40 to step S42 of FIG. 6, the service section 33-2 of the online banking service, which has received the request for verification, verifies the response by the authentication processing section 32.

When a result of the verification of the response is successful, in step S43 of FIG. 6, the service section 33-2 of the ATM service causes the display section 26 of the equipment 20 (ATM) to display the service menu of the ATM. Consequently, the service menu of the ATM is made available.

Next, the step of performing transaction by a user on the equipment 20 (ATM) will be described using a cash withdrawal service as an example. As described above, an example will be described, in which when the service menu of the ATM is made effective, the user authentication processing is performed, then when a transaction is performed, the user authentication processing is performed again.

When a user inputs an amount to be withdrawn, and presses a withdrawal button on the screen of the equipment 20 (ATM), the user authentication processing is performed again. In this process, the generation section 28 of the equipment 20 (ATM) generates transaction data in which transaction details are coded. A picture image is generated, which is converted from a message, for instance, "10,000 yen is withdrawn. Is it all right?" to prompt the user to confirm the transaction.

In step S31 of FIG. 6, as a service request, the equipment 20 (ATM) transmits a command to withdraw cash, an amount, and transaction data to the service section 33-2 of the ATM service. In step S32 of FIG. 6, similarly to the first user authentication processing, the service section 33-2 of the ATM service transmits a user authentication request along with a second challenge to the equipment 20 (ATM). In step S34 of FIG. 6, the equipment 20 (ATM), which has received the user authentication request, transmits the transaction data along with the second challenge to the information processing device 10.

In step S35 of FIG. 6, the information processing device 10 displays the transaction data on the screen. The user sees a message such as "10,000 yen is withdrawn. Is it all right?" displayed on the screen to prompt the user to confirm the transaction, and checks whether or not the message matches the transaction details inputted to the screen of the equipment 20 (ATM). When the message is confirmed, an operation of user authentication such as biometric authentication is performed.

In step S36 of FIG. 6, when the user authentication is performed in the information processing device 10 and the authentication is successful, in step S37 of FIG. 6, the information processing device 10 generates a response and encodes the transaction data with the secret key of the user. In step S38 of FIG. 6, the information processing device 10 sends back the encoded transaction data along with the response to the equipment 20 (ATM).

In step S39 of FIG. 6, the equipment 20 (ATM) transmits the sent back response and transaction data to the service section 33-2 of the ATM service. Similarly to the pair of the response and the challenge, the service section 33-2 of the ATM service transmits the transaction data first transmitted from the equipment 20 (ATM), and the transaction data encoded in the information processing device 10 to the service section 33-1 of the banking service to request for verification.

In step S40 of FIG. 6, the service section 33-1 of the banking service decodes the transaction data encoded by the authentication processing section 32 in the information processing device 10 with the public key of the user.

In step S41 of FIG. 6, the service section 33-1 of banking service determines by the authentication processing section 32 whether or not decoding the transaction data first transmitted from the equipment 20 (ATM), and the transaction data encoded in the information processing device 10 with the public key of the user provides matching data.

When the determination indicates matching, the service section 33-1 of the banking service notifies the service section 33-2 of the ATM service of successful verification. When being notified of successful verification, the service section 33-2 of the ATM service rewrites the account information of the user on the account database.

In step S43 of FIG. 6, the service section 33-2 of the ATM service notifies the equipment 20 (ATM) of successful transaction. The CD control section 27 of the equipment 20 (ATM) controls a cash dispenser (CD) to allow withdrawal of cash. In the process described above, falsification of transaction details displayed on the information processing device 10 is not possible from the equipment 20 (ATM) or another module on the information processing device 10 since the transaction details are encoded in the information processing device 10 until the transaction details are verified in the server apparatus 30. Therefore, it is possible to guarantee that the transaction details inputted via the equipment 20 (ATM) match the transaction details visually checked by the user in the information processing device 10.

Conventionally, the online banking is utilized by a smartphone, and ATM is utilized by a cash card, that is, different utilization methods have been adopted. However, the processing according to the fifth embodiment allows the same smartphone and the same authentication method to be utilized for both the online banking and ATM, and thus convenience is improved.

It is to be noted that this embodiment is not limited to ATM and the online banking service, and is applicable to a case where the services utilized by the information processing device and the services utilized by the device have a common service.

Sixth Embodiment

In a sixth embodiment, an example, in which the information processing system 1 according to the first embodiment or the second embodiment is applied to a service allowing suspension and resumption of the service at the time of loss of the information processing device 10, will be described.

The service section 33 of the server apparatus 30 according to the sixth embodiment provides a service that allows suspension and resumption of the service at the time of loss of the information processing device 10.

<Processing>

Next, the processing performed by the information processing system 1 according to the sixth embodiment will be described.

When a user has lost the information processing device 10, the user uses the telephone number of a support center previously informed, for instance, at the time of service use registration, and notifies the support center that the information processing device 10 is lost. It is to be noted that a method of contacting with the support center may be telephone contact via an operator or a method of inputting a command by an automated answering system. Alternatively, notification may be made by a short message (SMS). Alternatively, contact may be made from the information processing device 10 such as a personal computer to the website of the support center.

When identification of the user and an incident of loss of the information processing device 10 are inputted by the support center, the server apparatus 30 erases the public key of the user from the authentication information storage section 31. In addition, to protect against unauthorized registration processing by another user who finds the lost information processing device 10, using the own biometric information, the server apparatus 30 makes setting for registration suspension in association with the ID of the user who has lost the information processing device 10 or the ID of the lost information processing device 10. Consequently, subsequent use of the service and re-registration are not allowed for the user or the lost information processing device 10.

Next, a case will be described in which the lost information processing device 10 is returned to the user or the user changes to a new model of the information processing device 10.

Similarly to the case of loss of the information processing device 10, the user makes contact with the support center to request for resumption of the service.

When identification of the user and an incident of finding of the information processing device 10 are inputted by the support center, the server apparatus 30 cancels the setting of registration suspension for the user.

Subsequently, when the user performs the registration processing again in the information processing device 10, the server apparatus 30 generates a new key pair and performs re-registration of the key. After this, the service is available with a new key as before the loss of the information processing device 10.

When the user changes the information processing device 10 to a new model, the user installs the application for registration to the new information processing device 10, and makes contact with the support center to request for resumption of the service, then performs registration processing on the application for registration to allow the service to be available.

As described above, according to this embodiment, using the certificate information of the server apparatus 30 which is authenticated by both the information processing device 10 and the equipment 20, when the information processing device 10 and the equipment 20 are close to each other, use of the server apparatus 30 trusted by the both is verified by short-distance wireless communication. Then, a safe connection route for passing user authentication protocols is temporarily established. Furthermore, the information processing device 10 transmits status information to the server apparatus 30, the status information indicating authentication status such as which connection route is used at the time of user authentication. Consequently, the server apparatus 30 compares the status information on this side with the status information from the information processing device 10, verifies that both the status information match, and thus it is possible to guarantee that user authentication using a correct route has been performed.

Although the embodiments of the present disclosure have been described in detail above, the present disclosure is not limited to such specific embodiments, and various modifications and changes may be made in a range of the gist of the present disclosure described in claims.

For instance, the functional sections of the information processing device 10, the equipment 20, and the server apparatus 30 may be implemented by cloud computing that includes one or more computers, for instance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
   transmitting a first random value by proximity radio communication to a device coupled via a server and a network;
   receiving first data in which the first random value is encoded, from the device by the proximity radio communication;
   determining whether the first random value matches a value obtained by decoding the first data with a server key obtained in advance from the server;
   when the value obtained by decoding the first data matches the first random value, authenticating the device;
   connecting with the device;
   receiving, from the device through the connection, a second random value generated by the server;
   authenticating a user corresponding to the device based on the received second random value;
   generating information on the connection established for the authentication; and
   transmitting, to the server via the device over the connection, second data in which the authenticated result together with the information are encoded with a secret key of the user.

2. The non-transitory, computer-readable recording medium according to claim 1,
   wherein when the value obtained by decoding the first data matches the first random value, the program causes the information processing device to execute processing for receiving information that identifies an authentication method for the user, from the device, and processing for authenticating the user is authenticating the user by a method according to the information.

3. The non-transitory, computer-readable recording medium according to claim 1,
   wherein the program causes the information processing device to execute processing for transmitting status information on the authenticating the user along with the result of the authenticating the user.

4. An information processing device comprising:
   a memory; and
   a processor coupled to the memory, and the processor configured to:
   transmit a first random value by proximity communication to a device via a server and a network;
   receive first data in which the first random value is encoded, from the device by the proximity communication;
   determine whether the first random value matches a value obtained by decoding the first data with a server key obtained in advance from the server;
   when the value obtained by decoding the first data matches the first random value, authenticate the device;
   connect with the device,
   receive, from the device through the connection, a second random value generated by the server;
   authenticate a user corresponding to the device based on the received second random value;
   generate information on the connection established for the authentication; and
   transmit, to the server via the device over the connection, second data in which the authenticated result together with the information are encoded with a secret key of the user.

5. The information processing device according to claim 4,
   wherein when the value obtained by decoding the first data matches the first random value, the processor is configured to receive information that identifies an authentication method for the user, from the device, and the processor is configured to authenticate the user by a method according to the information.

6. The information processing device according to claim 4,
   wherein the processor is configured to transmit status information on the authenticating the user along with the result of the authenticating the user.

7. An information processing system comprising:
   an information processing device, a device, and a server,
   wherein the information processing device having a processor is configured to:
   transmit a first random value by proximity communication to a device via the server and a network;
   receive first data in which the first random value is encoded, from the device by the proximity communication;
   determine whether the first random value matches a value obtained by decoding the first data with a server key obtained in advance from the server;
   when the value obtained by decoding the first data matches the first random value, authenticate the device;
   connect with the device;
   receive, from the device through the connection, a second random value generated by the server;
   authenticate a user corresponding to the device based on the received second random value;
   generate information on the connection established for the authentication; and transmit, to the server via the device over the connection, second data in which the authenticated result together with the information are encoded with a secret key of the user, and the device is configured to:
transmit the first random value received from the information processing device to the server;
transmit the first data received from the server to the information processing device, and the server is configured to:
encode the first random value received from the device with a secret key of the server, and transmit the first data which is encoded value to the device.

8. The information processing system according to claim 7,
wherein when the value obtained by decoding the first data matches the first random value, the information processing device receives information that identifies an authentication method for the user, from the device, and
the information processing device authenticates the user by a method according to the information.

9. The information processing system according to claim 7,
wherein the information processing device transmits status information on the authenticating the user along with the result of the authenticating the user.

10. An information processing method performed by an information processing device having a processor, the method comprising:
transmitting a first random value by proximity communication to a device coupled via a server and a network;
receiving first data in which the first random value is encoded, from the device by the proximity communication;
determining whether the first random value matches a value obtained by decoding the first data with a server key obtained in advance from the server;
when the value obtained by decoding the first data matches the first random value, authenticating the device;
connecting with the device;
receiving, from the device through the connection, a second random value generated by the server,
authenticating a user corresponding to the device based on the received second random value;
generating information on the connection established for the authentication; and
transmitting, to the server via the device over the connection, second data in which the authenticated result together with the information are encoded with a secret key of the user.

11. The information processing method according to claim 10,
wherein when the value obtained by decoding the first data matches the first random value, the information processing method causes the information processing device to execute processing for receiving information that identifies an authentication method for the user, from the device, and
processing for authenticating the user is authenticating the user by a method according to the information.

12. The information processing method according to claim 10,
wherein the processing for authenticating the user is transmitting status information on the authenticating the user along with the result of the authenticating the user.

* * * * *